(12) United States Patent
Xu et al.

(10) Patent No.: US 12,738,577 B2
(45) Date of Patent: Sep. 15, 2026

(54) TOP COVER ASSEMBLY FOR BATTERY, BATTERY, AND ENERGY STORAGE DEVICE

(71) Applicant: Hithium Tech HK Limited, Kowloon (HK)

(72) Inventors: Weidong Xu, Xiamen (CN); Nan Zhang, Xiamen (CN); Ziqi Yi, Xiamen (CN); Zuyu Wu, Xiamen (CN)

(73) Assignee: Hithium Tech HK Limited, Kowloon (HK)

( * ) Notice: Subject to any disclaimer, the term of this patent is extended or adjusted under 35 U.S.C. 154(b) by 721 days.

(21) Appl. No.: 17/951,666

(22) Filed: Sep. 23, 2022

(65) Prior Publication Data

US 2023/0087349 A1 Mar. 23, 2023

(30) Foreign Application Priority Data

Sep. 23, 2021 (CN) ......................... 202122307694.1

(51) Int. Cl.
*H01M 50/147* (2021.01)
*H01M 50/102* (2021.01)
*H01M 50/593* (2021.01)

(52) U.S. Cl.
CPC ....... *H01M 50/147* (2021.01); *H01M 50/102* (2021.01); *H01M 50/593* (2021.01)

(58) Field of Classification Search
CPC . H01M 50/147; H01M 50/102; H01M 50/593
See application file for complete search history.

(56) References Cited

U.S. PATENT DOCUMENTS

2011/0200870 A1* 8/2011 Kim .................... H01M 50/567 429/179
2015/0243955 A1* 8/2015 Kang .................. H01M 50/176 429/179
2017/0187027 A1* 6/2017 Ono .................... H01M 50/636
2020/0212386 A1* 7/2020 Jin .................... H01M 10/0463

FOREIGN PATENT DOCUMENTS

CN 213989022 U * 8/2021

OTHER PUBLICATIONS

Machine translation CN213989022U (Year: 2025).*

* cited by examiner

*Primary Examiner* — Brian R Ohara
*Assistant Examiner* — M. T. Leonard
(74) *Attorney, Agent, or Firm* — Hodgson Russ LLP

(57) ABSTRACT

A top cover assembly for a battery, a battery, and an energy storage device are provided in the disclosure. The top cover assembly for a battery includes a pole and a pressing block. The pressing block defines a limiting hole. The pole extends through and is at least partially located in the limiting hole. The limiting hole has a first hole section and a second hole section axially connected with the first hole section. The first hole section has a radial size larger than the second hole section. In the top cover assembly for a battery according to implementations of the disclosure, the first hole section and the second hole section connected in the axial direction can make an inner circumferential wall of the limiting hole stepped.

18 Claims, 25 Drawing Sheets

TOP COVER ASSEMBLY FOR BATTERY, BATTERY, AND ENERGY STORAGE DEVICE

CROSS-REFERENCE TO RELATED APPLICATION(S)

This application claims priority under 35 U.S.C. § 119(a) to and the benefit of Chinese Patent Application Serial No. 202122307694.1, filed Sep. 23, 2021, the entire disclosure of which is hereby incorporated by reference.

TECHNICAL FIELD

This disclosure relates to the technical field of batteries, and in particular, to a top cover assembly for a battery, a battery, and an energy storage device.

BACKGROUND

With the development of society, the aggravation of environmental pollution, and the depletion of traditional energy sources, people are becoming more and more aware of environmental protection. Lithium-ion batteries have become the first choice of green energy because of their high energy density, high voltage, low discharge rate, and long cycle life, and are therefore widely used in portable devices such as Bluetooth headsets, cell phones, digital cameras, and tablet computers, as well as large devices such as electric vehicles and energy storage power plants.

In comparison, cylindrical flexible packaging lithium-ion batteries have a better internal space utilization. Although cylindrical flexible packaging lithium-ion batteries have been put into practical applications, positions of poles of the existing cylindrical batteries are fixed, which leads to uneven pole structures and large assembly errors after welding or riveting.

SUMMARY

The disclosure aims to solve at least one of technical problems in related art. To this end, a top cover assembly for a battery is provided in the disclosure.

A battery is also provided in the disclosure. The battery includes the above-mentioned top cover assembly for a battery.

An energy storage device is also provided in the disclosure. The energy storage device includes multiple above-mentioned batteries.

A top cover assembly for a battery according to implementations of the disclosure includes a pole and a pressing block. The pressing block defines a limiting hole. The pole extends through and is at least partially located in the limiting hole. The limiting hole has a first hole section and a second hole section axially connected with the first hole section. The first hole section has a radial size larger than the second hole section.

In the top cover assembly for a battery according to the implementations of the disclosure, the first hole section and the second hole section connected in the axial direction can make an inner circumferential wall of the limiting hole stepped, which is beneficial to receive solder or a riveting deformation structure of one end of the pole. As such, it allows not only a flatness improvement but also a tolerance adjustment to the top cover assembly, assembly accuracy of the top cover assembly is improved, and thus the top cover assembly is optimized in structure.

In some implementations, the limiting hole further has a third hole section. The third hole section, the second hole section, and the first hole section are sequentially connected in an axial direction of the limiting hole. The third hole section has a radial size smaller than the second hole section to form a step portion. The step portion abuts against the pole.

In some implementations, the pole has a main body and a first flange. The first flange is located at an edge of one end of the main body, projects radially from the main body, and extends in a circumferential direction of the main body.

The main body is at least partially located in the third hole section. The first flange is at least partially located in the second hole section and abuts against the step portion.

In some implementations, the pole further has a second flange. The second flange is located at an edge of the other end of the main body, projects radially from the main body, and extends in the circumferential direction of the main body.

In some implementations, the top cover assembly for a battery further includes an insulating cover plate stacked with the pressing block. The insulating cover plate has a mounting hole opposite to the limiting hole. The pole extends through the mounting hole.

The second flange is located at one side of the insulting cover plate away from the pressing block and abuts against the insulting cover plate.

In some implementations, the top cover assembly for a battery further includes a top cover plate and an insulating member. The top cover plate is sandwiched between the insulating member and the insulating cover plate. The pressing block, the insulating member, the top cover plate, and insulating cover plate are sandwiched between the first flange and the second flange.

In some implementations, the limiting hole has a first chamfer at one end of the limiting hole close to the insulating member.

In some implementations, a surface of the first flange away from the second flange is flush with an inner bottom surface of the first hole section.

A battery according to the implementations of the disclosure includes the above-mentioned top cover assembly for a battery. In the battery according to the implementations of the disclosure, the limiting hole is stepped and used to receive solder or a riveting deformation structure of one end of the pole, which allows not only a flatness improvement but also a tolerance adjustment to the top cover assembly, assembly accuracy of the top cover assembly is improved, and thus the top cover assembly is optimized in structure.

An energy storage device according to the implementations of the disclosure includes multiple above-mentioned batteries. In the energy storage device according to the implementations of the disclosure, the limiting hole is stepped and used to receive solder or a riveting deformation structure of one end of the pole, which allows not only a flatness improvement but also a tolerance adjustment to the top cover assembly, assembly accuracy of the top cover assembly is improved, and thus the top cover assembly is optimized in structure.

BRIEF DESCRIPTION OF THE DRAWINGS

The above and/or additional aspects and advantages of the disclosure will become clear and better appreciated from implementations described in conjunction with the following accompanying drawings, wherein.

REFERENCE SIGNS top cover assembly: 100; insulating cover plate: 110; mounting hole: 111; limiting rib: 112; first limiting rib: 113; second limiting rib: 114; third limiting rib: 115; reinforcing rib: 116; abutment portion: 117; protective flange: 118; bending edge: 119; top cover plate: 120; through hole: 121; anti-rotation groove: 122; insulating member: 130; positioning hole: 131; boss: 132; second chamfer: 133; third chamfer: 134; fitting groove: 135; anti-rotation flange: 136; first anti-rotation edge: 137; second anti-rotation edge: 138; pressing block: 140; limiting hole: 141; first chamfer: 142; first hole section: 143; second hole section: 144; third hole section: 145; fitting protrusion: 146; step portion: 147; pole: 150; main body: 151; first flange: 152; second flange: 153; sealing cavity: 154; gap: 155; sealing member: 156; current collector: 160; first crease: 161; first groove: 1611; second crease: 162; second groove: 1621; first part: 163; second part: 164; third part: 165; enlarged section: 166; avoidance gap: 167; avoidance hole: 168; explosion-proof hole: 170; explosion-proof valve: 171; liquid-injection hole: 172; liquid-injection hole plug: 173; battery: 1000; case: 200; energy storage device: 2000; housing: 2200; opening: 157; battery core 400.

DETAILED DESCRIPTION

Exemplary implementations of the disclosure will be described in detail hereinafter with reference to the accompanying drawings.

In the implementations of the disclosure, terms such as "center", "longitudinal", "lateral", "length", "width", "thickness", "on", "under", "front", "back", "left", "right", "vertical", "horizontal", "top", "bottom", "in", "out", "clockwise", "anticlockwise", "axial", "radial", "circumferential" referred to herein which indicate directional relationship or positional relationship are directional relationship or positional relationship based on accompanying drawings and are only for the convenience of description and simplicity, rather than explicitly or implicitly indicate that apparatuses or components referred to herein must have a certain direction or be configured or operated in a certain direction and therefore cannot be understood as limitation on the disclosure.

In addition, terms "first", "second", and the like are only used for description and cannot be understood as explicitly or implicitly indicating relative importance or implicitly indicating the number of technical features referred to herein. Therefore, features restricted by terms "first", "second", and the like can explicitly or implicitly include at least one of the features. In the context of the disclosure, unless stated otherwise, "multiple" refers to "at least two", such as two, three, and the like.

A top cover assembly 100 for a battery 1000 according to implementations of the disclosure is described hereinafter with reference to FIGS. 1-30. The top cover assembly 100 includes a pressing block 140 and a pole 150.

Figure 2:
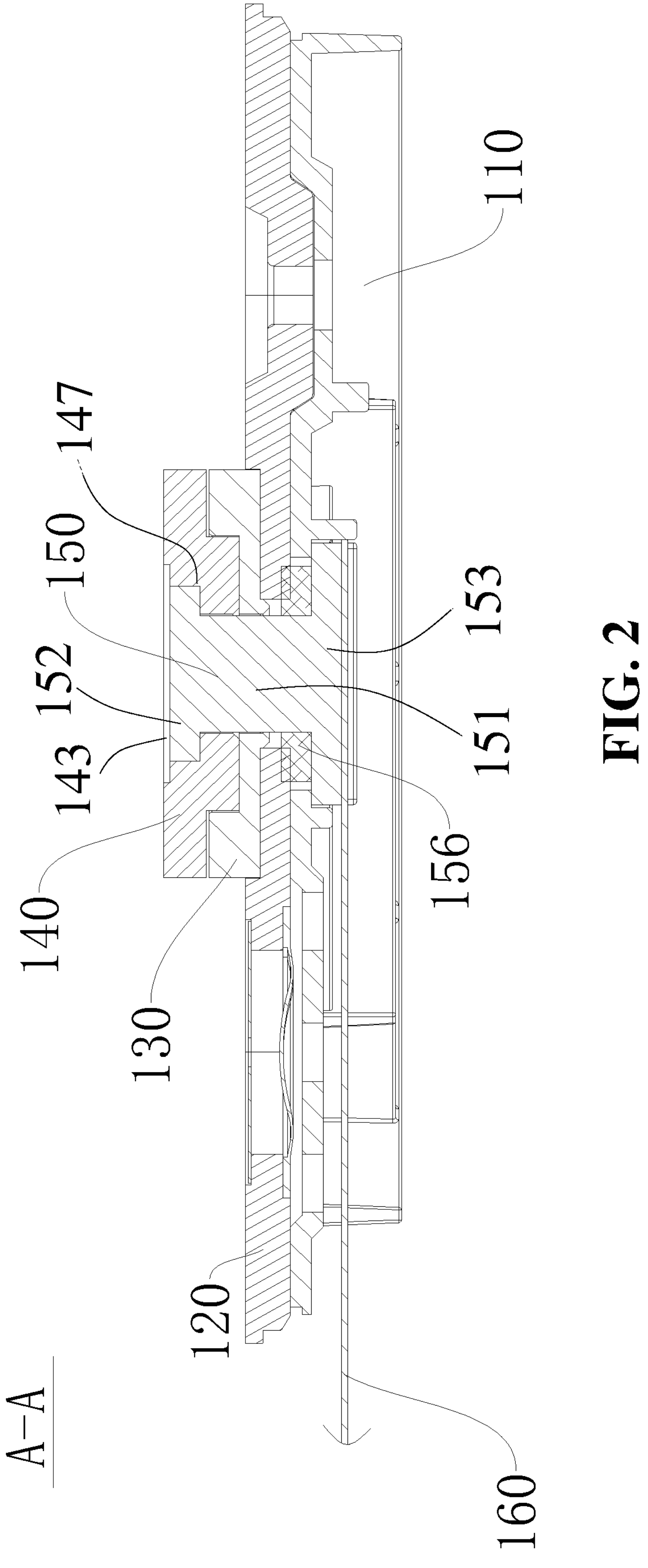
FIG. 2 is a cross-sectional view in direction A-A in FIG. 1.
Figure 3:
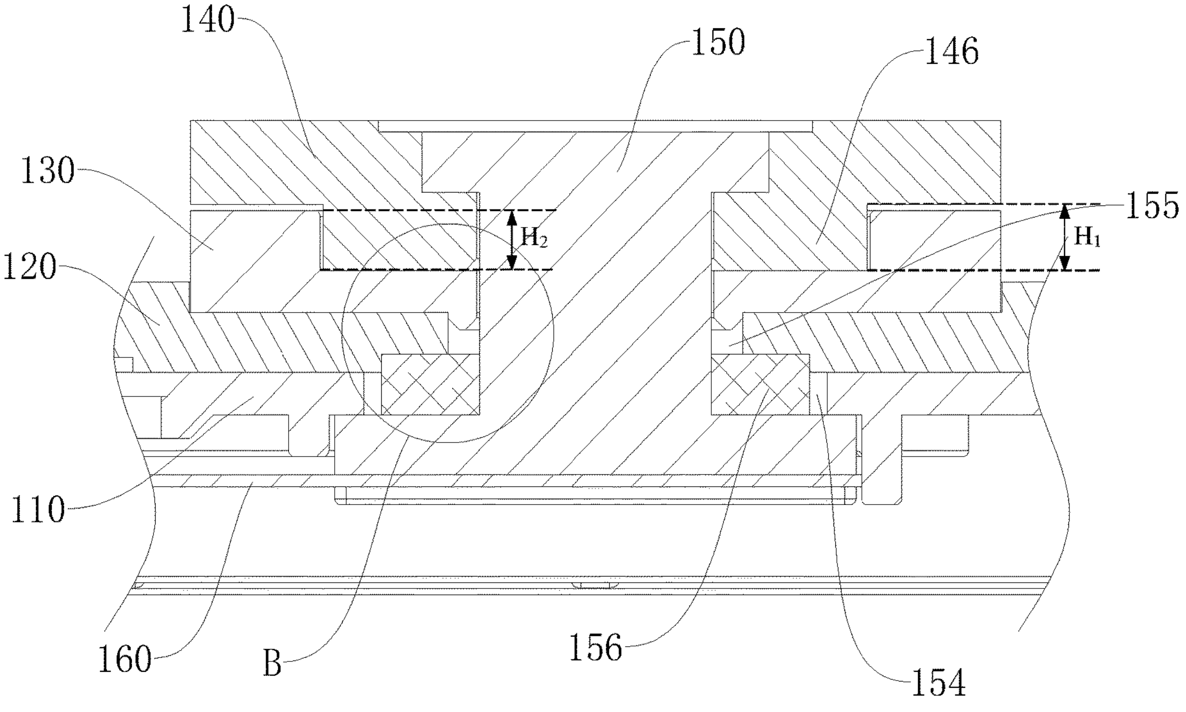
FIG. 3 is a partial schematic structural view in FIG. 2.

In some implementations, as illustrated in FIG. 2 and FIG. 3, the pressing block 140 defines a limiting hole 141. The pole 150 extends through and is at least partially located in the limiting hole 141. The limiting hole 141 has a first hole section 143 and a second hole section 144 axially connected with the first hole section 143. The first hole section 143 has a radial size larger than the second hole section 144. The top cover assembly 100 for a battery 1000 has advantages of high assembly precision and simple structure.

In the top cover assembly 100 for a battery 1000 according to implementations of the disclosure, the first hole section 143 and the second hole section 144 connected in the axial direction can make an inner circumferential wall of the limiting hole 141 stepped, which is beneficial to receive solder or a riveting deformation structure of one end of the pole 150. As such, it allows not only a flatness improvement but also a tolerance adjustment to the top cover assembly 100, assembly accuracy of the top cover assembly 100 is improved, and thus the top cover assembly 100 is optimized in structure.

Figure 13:
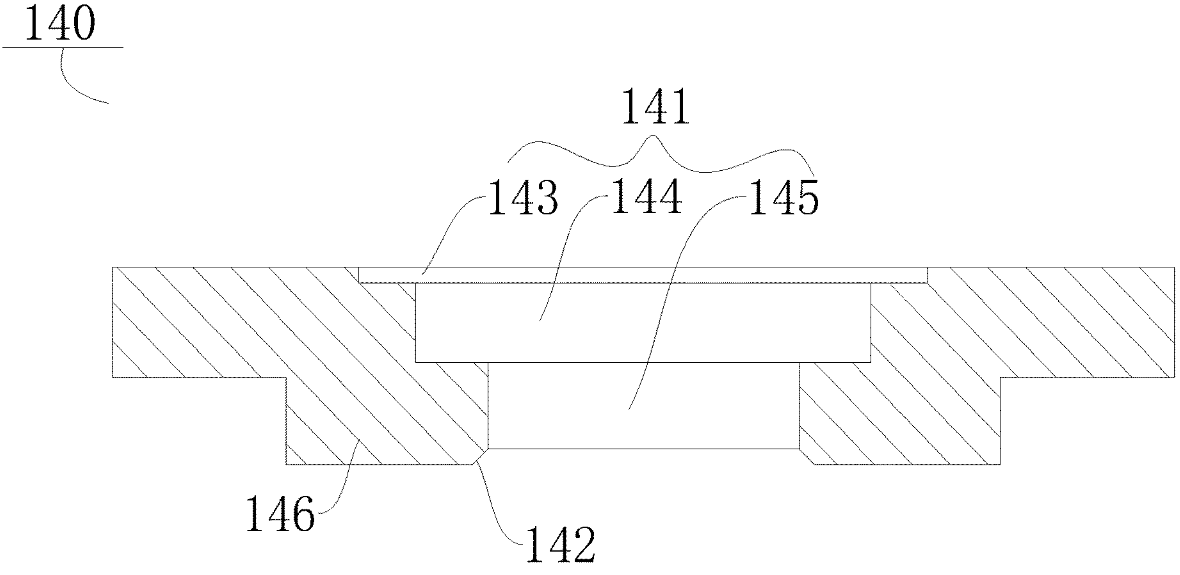
FIG. 13 is a schematic cross-sectional view of the pressing block in FIG. 9.

In some examples, as illustrated in FIG. 13, the limiting hole 141 may further have a third hole section 145. The third hole section 145, the second hole section 144, and the first hole section 143 are sequentially connected in an axial direction of the limiting hole 141. The third hole section 145 has a radial size smaller than the second hole section 144 to form a step portion 147. The step portion 147 abuts against the pole 150. As such, stability of the pole 150 in the limiting hole 141 can be improved, and at the same time, flatness of the top cover assembly 100 can be improved.

It is noted that, the second hole section 144 and the third hole section 145 can be used to receive the pole 150. The first hole section 143 has a radial size larger than the second hole section 144. In a case that an end of the pole 150 in the second hole section 144 needs to be soldered, an inner space of the first hole section 143 can be used to accommodate solder. In a case that the end of the pole 150 in the second hole section 144 needs to be riveted, the end of the pole 150 will deform to generate a protrusion after riveting, and the inner space of the first hole section 143 can be used for receiving the protrusion.

Figure 10:
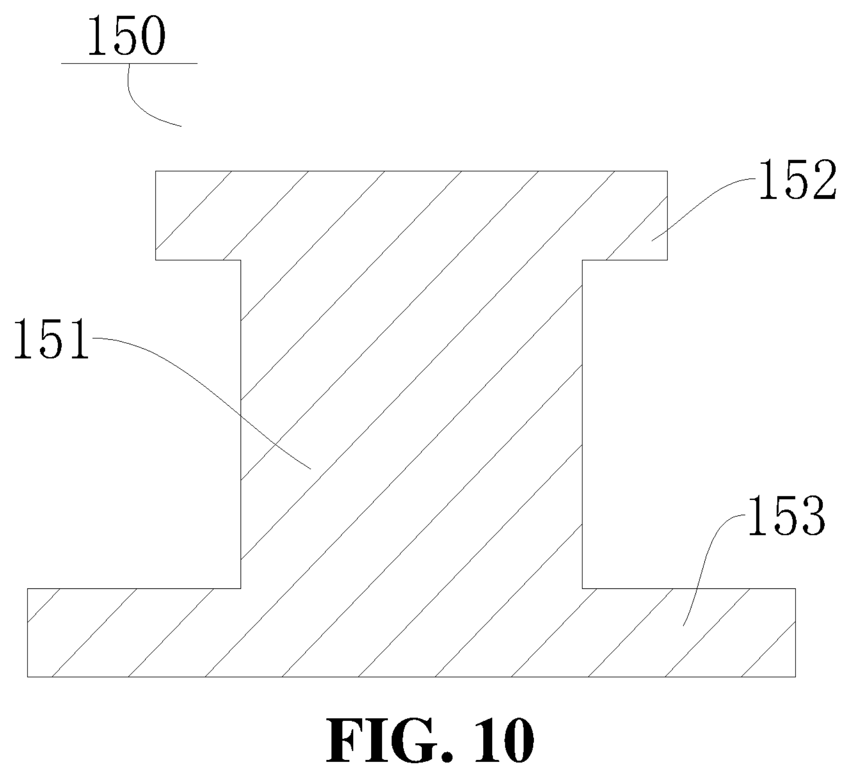
FIG. 10 is a schematic cross-sectional view of a pole in FIG. 9.
Figure 11:
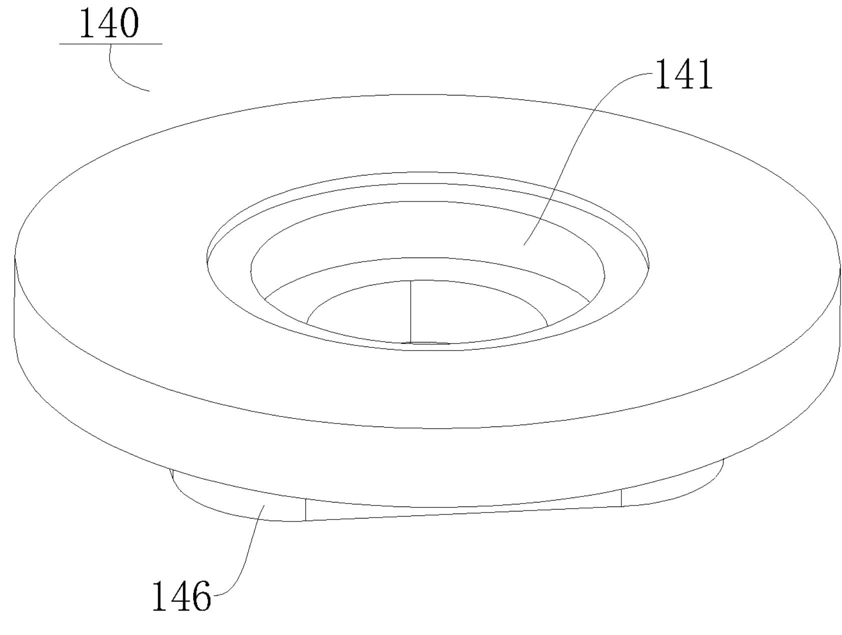
FIG. 11 is an isometric view of a pressing block in FIG. 9 from one view.
Figure 12:
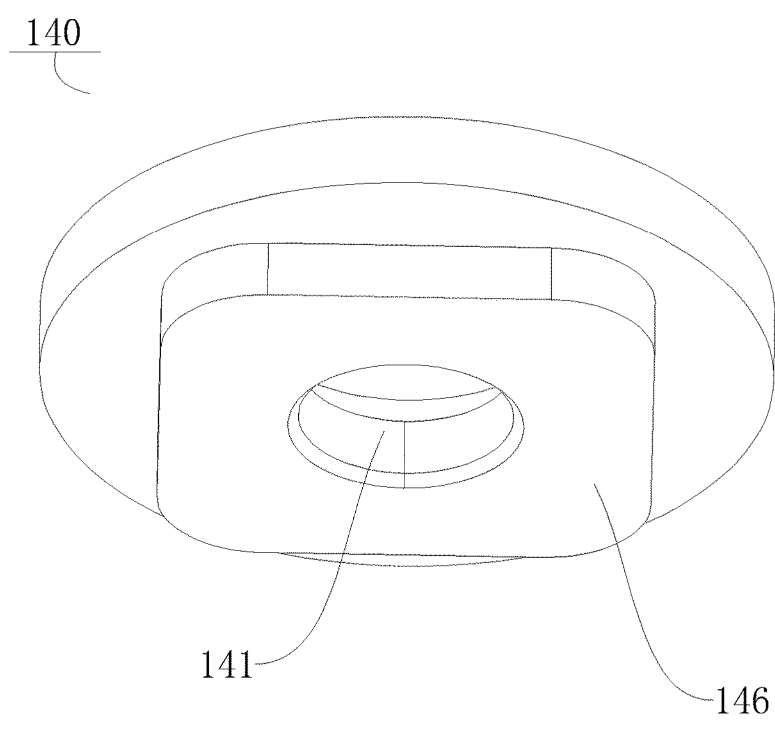
FIG. 12 is an isometric view of the pressing block in FIG. 9 from another view.

Further, as illustrated in FIG. 10, the pole 150 may have a main body 151 and a first flange 152. The first flange 152 is located at an edge of one end (for example, an upper end) of the main body 151, projects radially from the main body 151, and extends in a circumferential direction of the main body 151. The first flange 152 is beneficial to assemble the pole 150 with the limiting hole 141. The main body 151 is at least partially located in the third hole section 145. The first flange 152 is at least partially located in the second hole section 144 and abuts against the step portion 147, which can improve fitting stability between the pole 150 and the limiting hole 141.

In some implementations, as illustrated in FIG. 10, the pole 150 may further have a second flange 153. The second flange 153 is located at an edge of the other end (for example, a lower end) of the main body 151, projects radially from the main body 151, and extends in the circumferential direction of the main body 151. The second flange 153 projects radially from the main body 151, on the one hand, it may be beneficial to improve mounting stability of the pole 150 and facilitate a welding connection between the pole 150 and the current collector 160, and at the same time, it can facilitate formation of a sealing structure between the pole 150 and other structures and improving sealing of the top cover assembly 100.

In some implementations, as illustrated in FIG. 2, the top cover assembly 100 for a battery 1000 may further include an insulating cover plate 110 stacked with the pressing block 140. The insulating cover plate 110 has a mounting hole 111 opposite to the limiting hole, which facilitates mounting the pole 150. The pole 150 extends through the mounting hole 111. The second flange 153 is located at one side of the insulting cover plate 110 away from the pressing block 140 and abuts against the insulting cover plate 110, which can improve fitting stability between the insulating cover plate 110 and the pole 150, and at the same time, the second flange 153 can press the insulating cover plate 110, which can improve stability of the top cover assembly 100.

In some implementations, as illustrated in FIG. 2, the top cover assembly 100 for a battery 1000 may further include a top cover plate 120 and an insulating member 130. The top cover plate 120 is sandwiched between the insulating member 130 and the insulating cover plate 110. The pressing block 140, the insulating member 130, the top cover plate 120, and the insulating cover plate 110 are sandwiched between the first flange 152 and the second flange 153. Here, the first flange 152 and the second flange 153 can press and fix the pressing block 140, the insulating member 130, the top cover plate 120, and the insulating cover plate 110 which are stacked, which can improve the stability of the top cover assembly 100.

Figure 1:
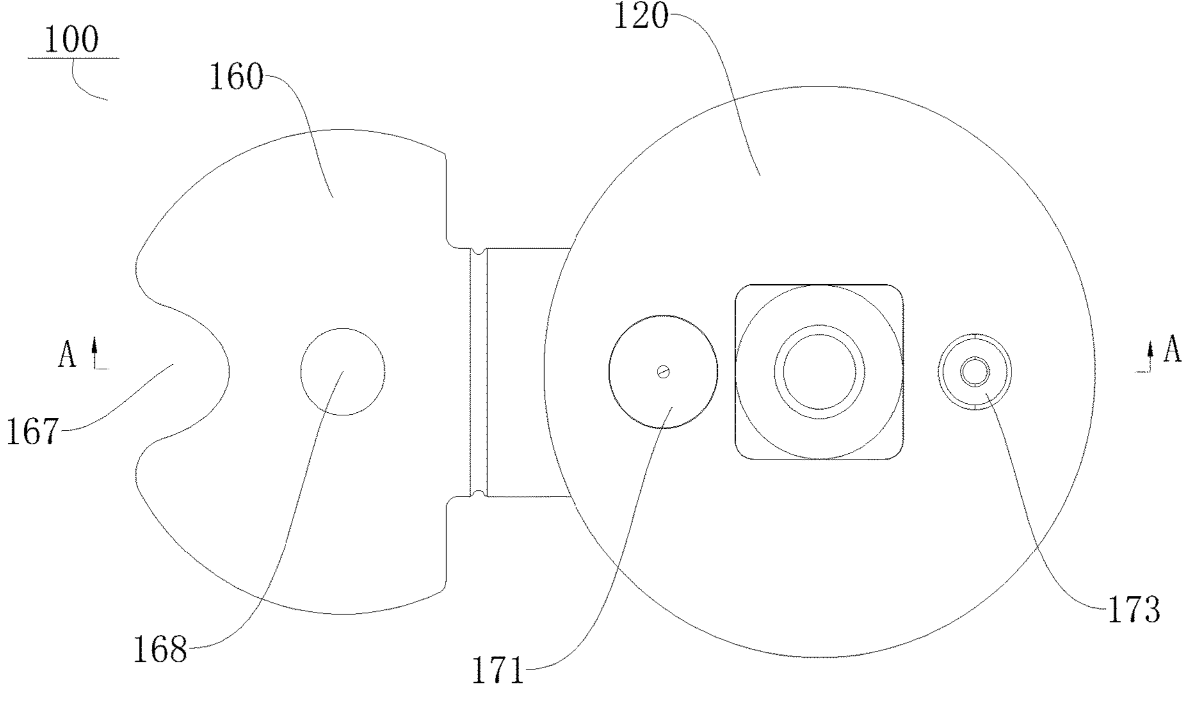
FIG. 1 is a top view of a top cover assembly for a battery according to implementations of the disclosure.
Figure 5:
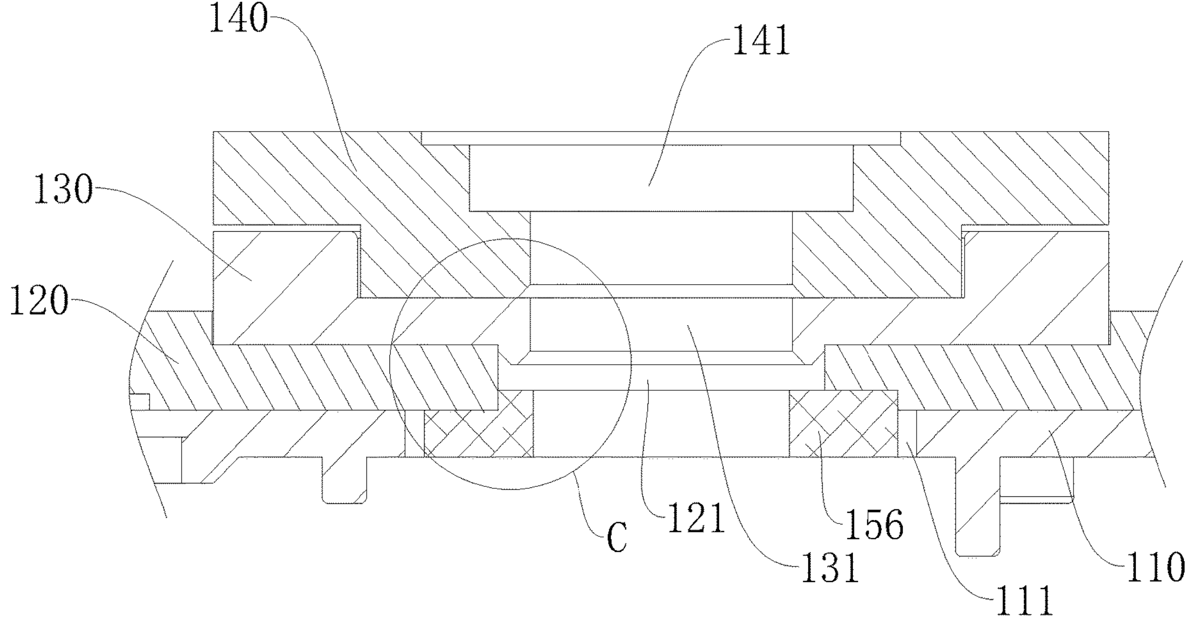
FIG. 5 is a partial structural schematic view in FIG. 2, with a pole omitted.
Figure 6:
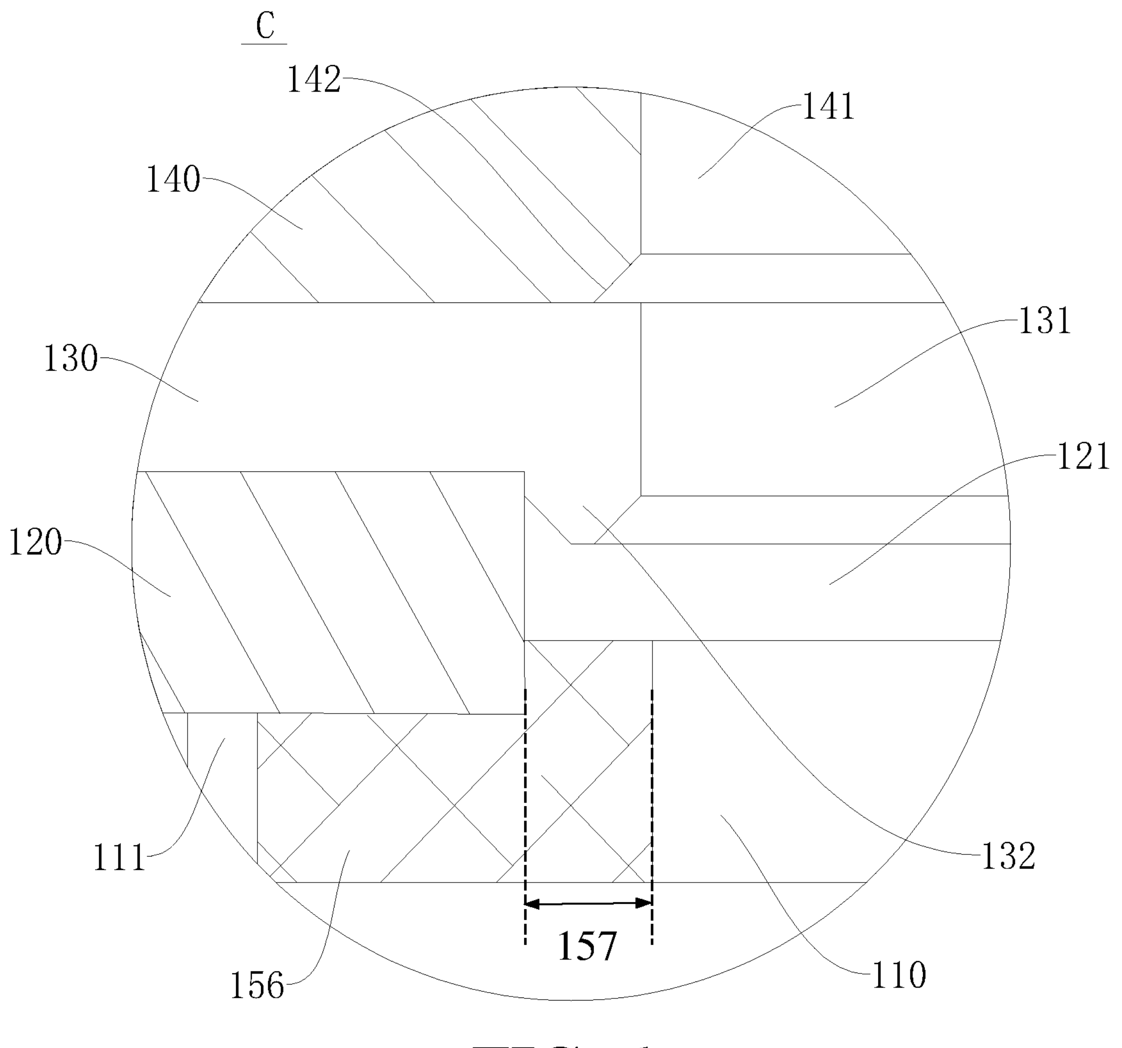
FIG. 6 is a partial enlarged schematic view at circle C in FIG. 5.
Figure 7:
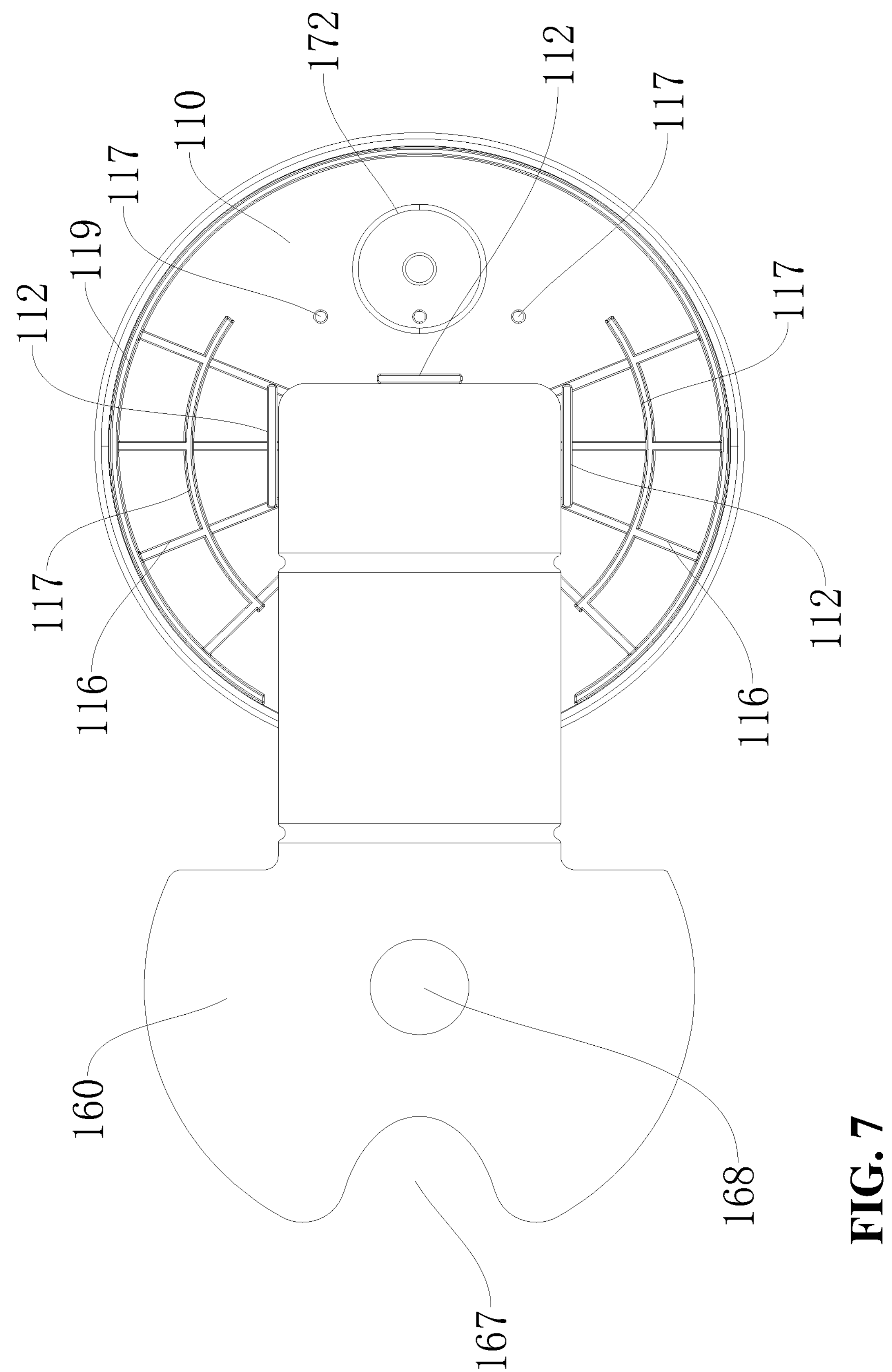
FIG. 7 is a top view of a top cover assembly for a battery according to implementations of the disclosure.
Figure 8:
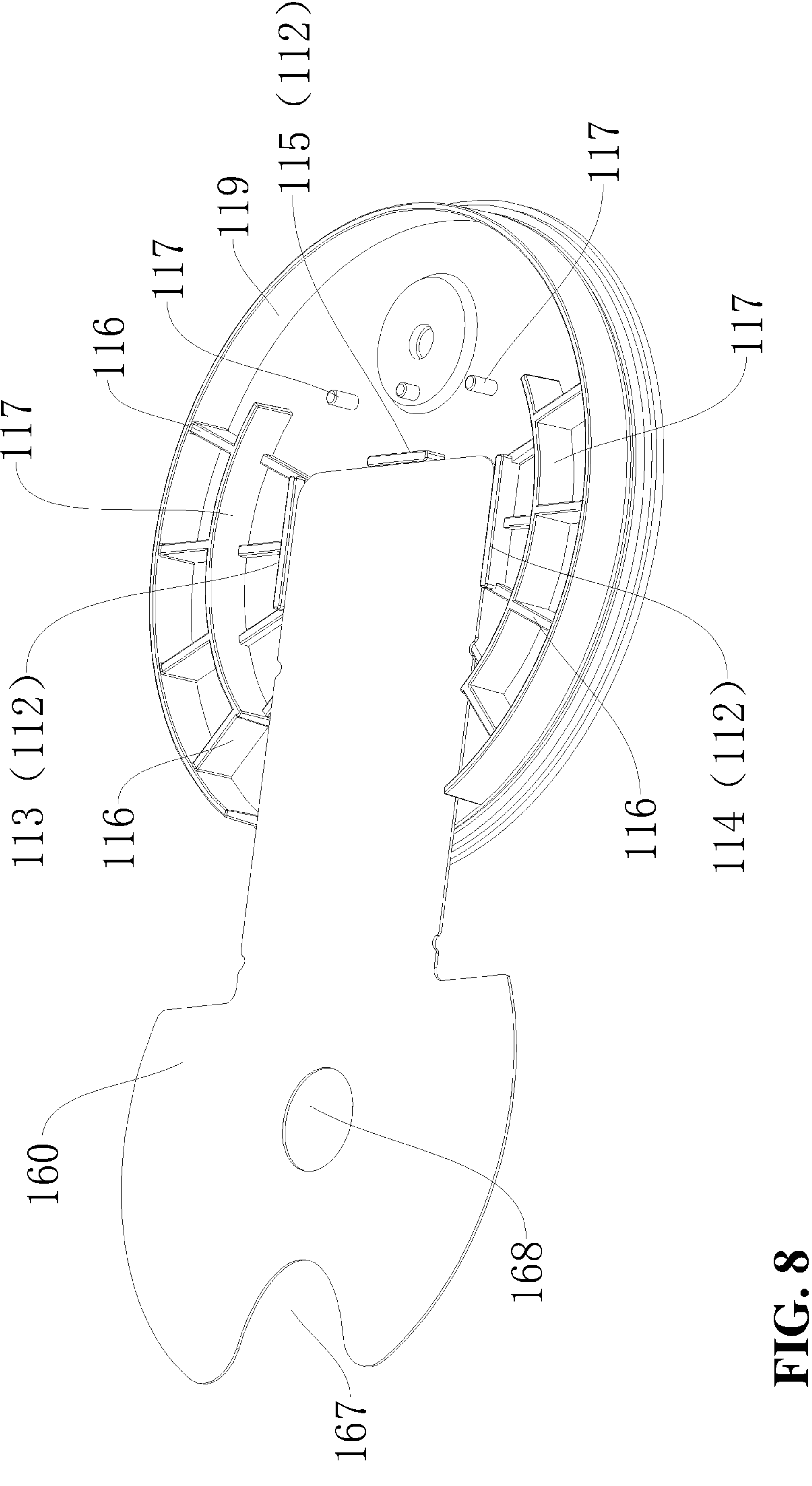
FIG. 8 is an isometric view of a top cover assembly for a battery according to implementations of the disclosure.
Figure 9:
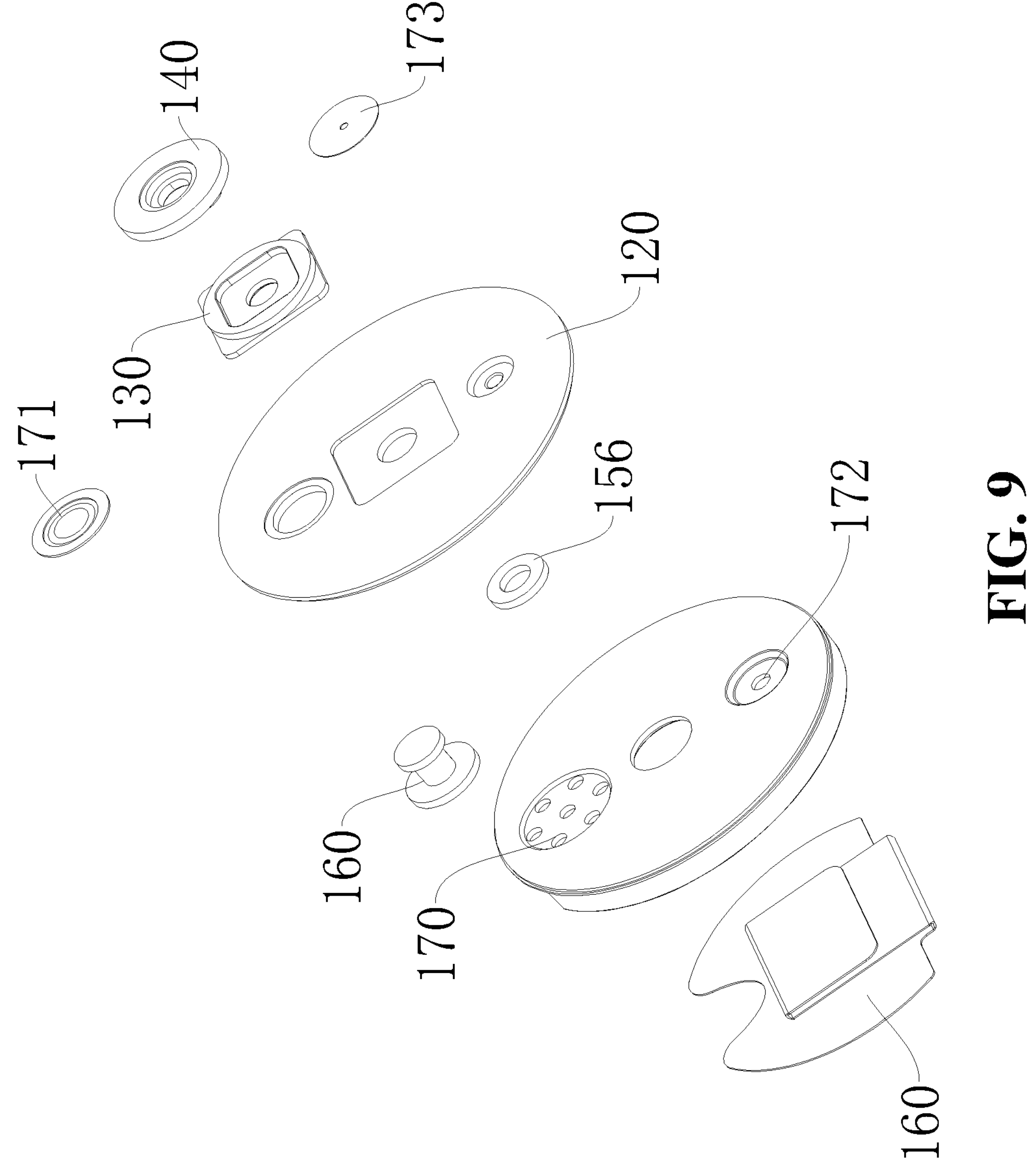
FIG. 9 is an exploded view of a top cover assembly for a battery according to implementations of the disclosure.

As illustrated in FIGS. 1-3, the insulating cover plate 110, the top cover plate 120, the insulating member 130, and the pressing block 140 are stacked in sequence from bottom to top. As illustrated in FIG. 5 and FIG. 6, the insulating cover plate 110 defines a mounting hole 111, the top cover plate 120 defines a through hole 121, the insulating member 130 defines a positioning hole 131, and the pressing block 140 defines a limiting hole 141. The mounting hole 111, the through hole 121, the positioning hole 131, and the limiting hole 141 are opposite to and communicate with one another in sequence to form a through hole in which the pole 150 can be mounted.

As illustrated in FIG. 3 and FIG. 10, the pole 150 can have the main body 151, the first flange 152, and the second flange 153. The main body 151 is cylindrical. The first flange 152 is located at an edge of one end of the main body 151. The first flange 152 projects radially from the main body 151. The first flange 152 extends in the circumferential direction of the main body 151. The second flange 153 is located at an edge of the other end of the main body 151. The second flange 153 projects radially from the main body 151. The second flange 153 extends in the circumferential direction of the main body 151.

In an implementation, as illustrated in FIG. 3, the main body 151 extends through the limiting hole 141, the positioning hole 131, the through hole 121, and the mounting hole 111. The pressing block 140, the insulating member 130, the top cover plate 120, and the insulating cover plate 110 are sandwiched between the first flange 152 and the second flange 153. The first flange 152 abuts against the pressing block 140. The second flange 153 abuts against the insulating cover plate 110. Here, the first flange 152 and the second flange 153 can press and fix the pressing block 140, the insulating member 130, the top cover plate 120, and the insulating cover plate 110 which are stacked, which can improve the stability of the top cover assembly 100.

As illustrated in FIG. 13, the limiting hole 141 has a first hole section 143, a second hole section 144, and a third hole section 145 which communicate in sequence. In an implementation, the first flange 152 is received in the second hole section 144. Part of the main body 151 is received in the third hole section 145.

According to some implementations of the disclosure, as illustrated in FIG. 3, a surface of the first flange 152 away from the second flange 153 is flush with an inner bottom surface of the first hole section 143. As such, it is convenient to weld or rive the pole 150, and the pole 150 will not occupy the inner space of the first hole section 143. Therefore, the first hole section 143 can accommodate solder or a riveting protrusion of the pole 150 to prevent the solder from overflowing or prevent the protrusion from projecting from a surface of the pressing block 140.

Figure 4:
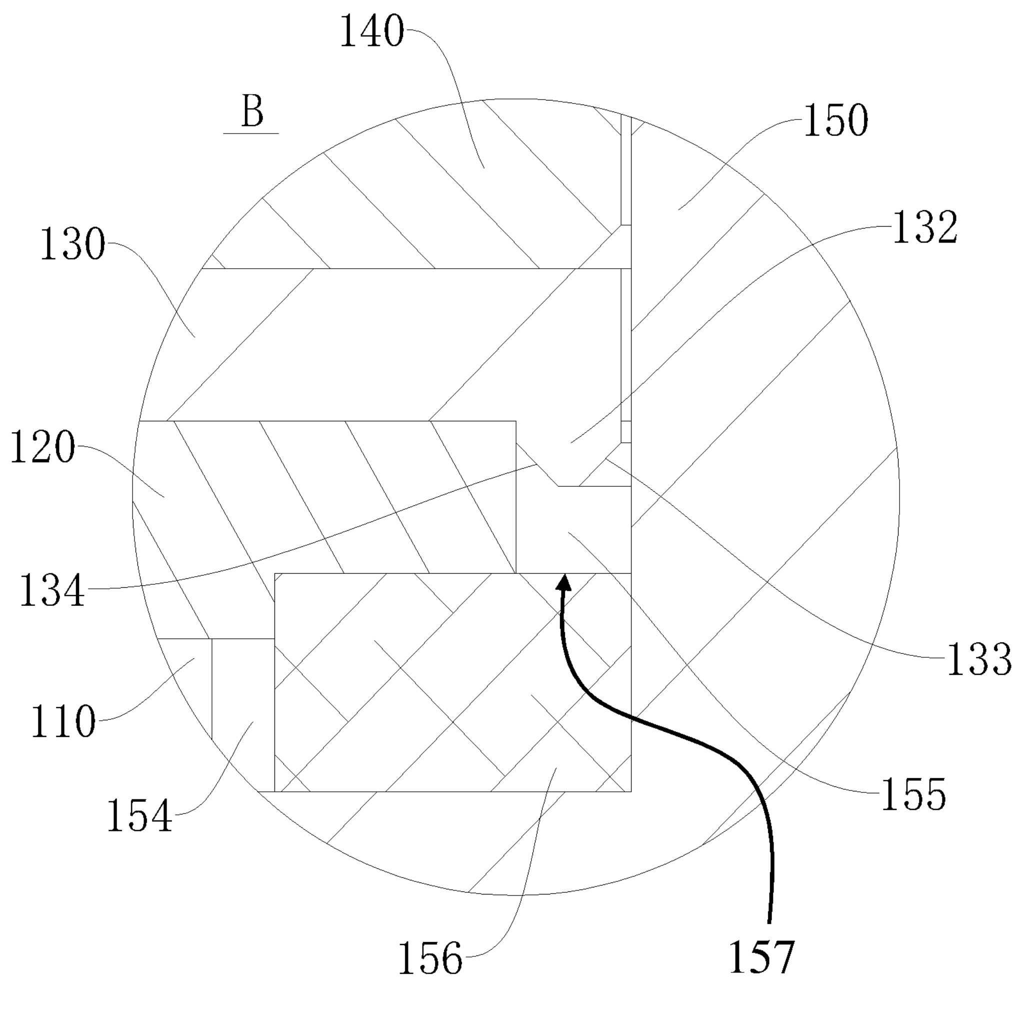
FIG. 4 is a partial enlarged schematic view at circle B in FIG. 3.

According to some implementations of the disclosure, as illustrated in FIGS. 4 to 6, the through hole 121 has a hole diameter smaller than the mounting hole 111. The positioning hole 131 has a hole diameter smaller than the through hole 121. As such, a through hole constructed by the through hole 121, the mounting hole 111, and the positioning hole 131 can have multiple hole segments with different diameters. Further, a surface of the second flange 153 close to the first flange 152, an inner circumferential wall of the mounting hole 111, and a surface of the top cover plate 120 close to the second flange 153 and extending beyond the inner circumferential wall of the mounting hole 111 define a sealing cavity 154. A sealing member 156 is received in the sealing cavity 154.

Furthermore, as illustrated in FIG. 4, an inner circumferential wall of the through hole 121 and an outer circumferential wall of the main body 151 define a gap 155 therebetween. The gap 155 communicates with the sealing cavity 154. That is, the sealing cavity 154 has an opening 157 at a position close to the gap 155, and the sealing cavity 154 communicates with the gap 155 via the opening 157. As such, when the sealing member 156 is assembled into the sealing cavity 154, an inner wall of the sealing cavity 154 extrudes the sealing member 156. Under the action of an extrusion force, part of the sealing member 156 is deformed. Since the sealing cavity 154 is in communication with the gap 155, the sealing member 156 is deformed toward an interior of the gap 155. Here, the part of the sealing member 156 can block the opening 157, which can improve the sealing effect of the sealing member 156.

As such, the sealing cavity 154 is constructed by using the pole 150, the pressing block 140, the insulating member 130, the top cover plate 120, and the insulating cover plate 110. The sealing cavity 154 is in communication with the gap 155 between the inner circumferential wall of the through hole 121 and the outer circumferential wall of the main body 151. When the sealing member 156 is assembled into the sealing cavity 154, part of the sealing member 156 can be deformed under the action of an extrusion force to block an opening 157, which improves the sealing effect of the sealing member 156.

According to some implementations of the disclosure, the mounting hole 111 has a cross-section gradually decreased in area in a direction from the second flange 153 to the first flange 152. It can be noted that for the mounting hole 111, the cross-section thereof is gradually decreased in area, so that a circumferential wall of the mounting hole 111 can be structured into an inclined circumferential wall. When the sealing member 156 is assembled into the mounting hole 111, the inclined circumferential wall has an extrusion effect on the sealing member 156, which can drive the sealing member 156 to deform toward the gap 155, thereby improving the sealing effect of the sealing member 156.

In an example illustrated in FIG. 13 and FIG. 6, the limiting hole 141 has a first chamfer 142 on an end of the limiting hole 141 close to the insulating member 130. On the one hand, with aid of a chamfering structure, a cutting stress during processing the pressing block 140 can be eliminated, which can improve structural strength of the pressing block 140. On the other hand, when assembling the pole 150, with aid of the first chamfer 142 which acts as a guide, the pole 150 can be guided to extend through the limiting hole 141.

Figure 17:
FIG. 17 is a cross-sectional view of the insulating member in FIG. 9.
Figure 17:
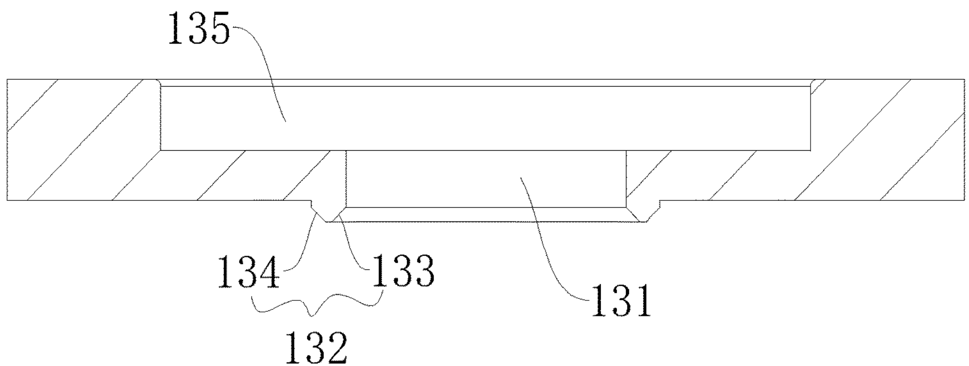

According to some implementations of the disclosure, as illustrated in FIGS. 3, 13, and 17, the pressing block 140 has a fitting protrusion 146 on a side of the pressing block 140 close to the insulating member 130. The insulating member 130 defines a fitting groove 135 on a side of the insulating member 130 close to the pressing block 140. The fitting protrusion 146 fits with the fitting groove 135. A height of the fitting protrusion 146 extending beyond the surface of the pressing block 140 is H1, and a depth of the fitting groove 135 is H2, where H1>H2. That is, the height of the fitting protrusion 146 is larger than the height of the fitting groove 135. As such, when the fitting protrusion 146 fits with the fitting groove 135, the fitting protrusion 146 will support the entire pressing block 140 so that the rest of the pressing block 140 other than the fitting protrusion 146 is spaced apart from the insulating member 130. Under the action of an assembly force of the top cover assembly 100, the fitting protrusion 146 will be in close contact with an inner bottom surface of the fitting groove 135, thereby improving sealing between the pressing block 140 and the insulating member 130. In order to prevent a relative rotation between the pressing block 140 and the insulating member 130, in some implementations, the fitting groove 135 is square.

Figure 14:
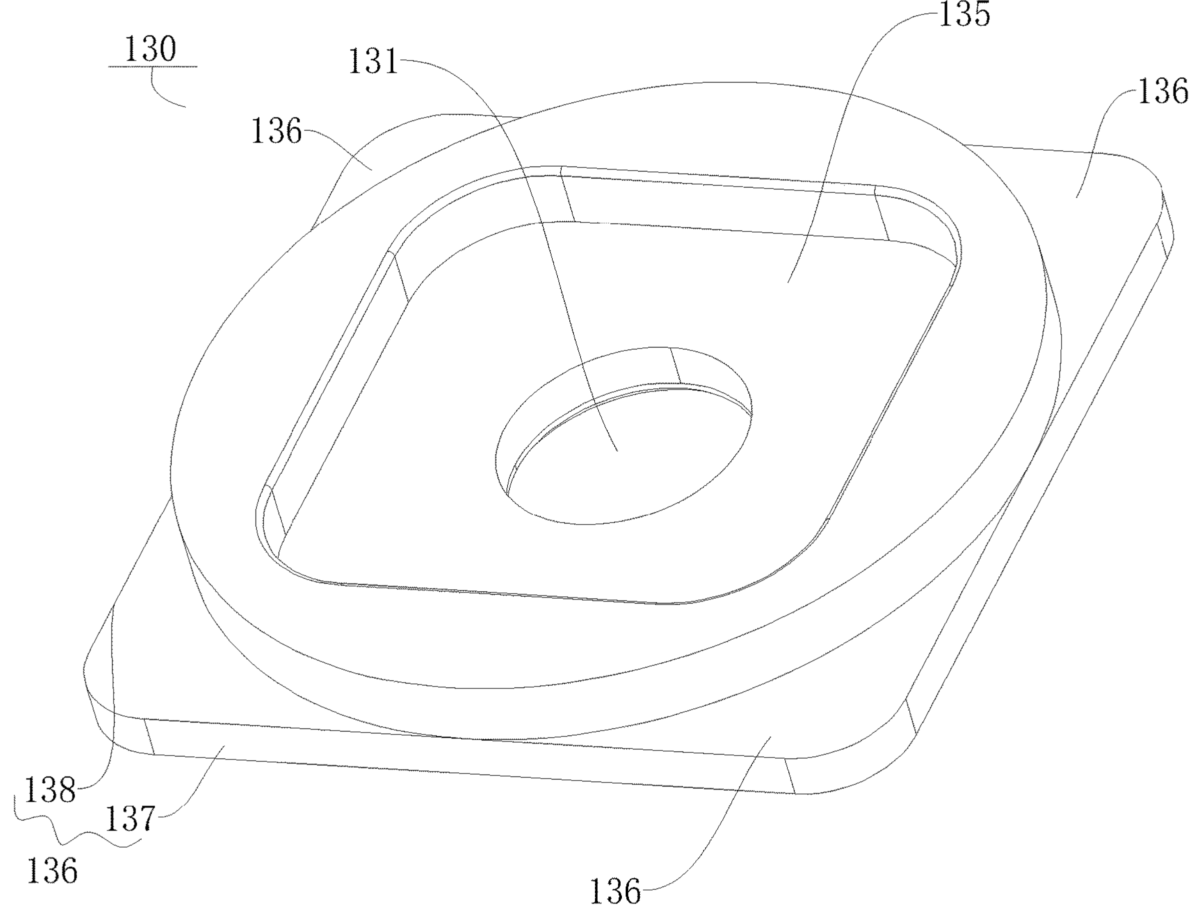
FIG. 14 is an isometric view of an insulating member in FIG. 9 from one view.
Figure 15:
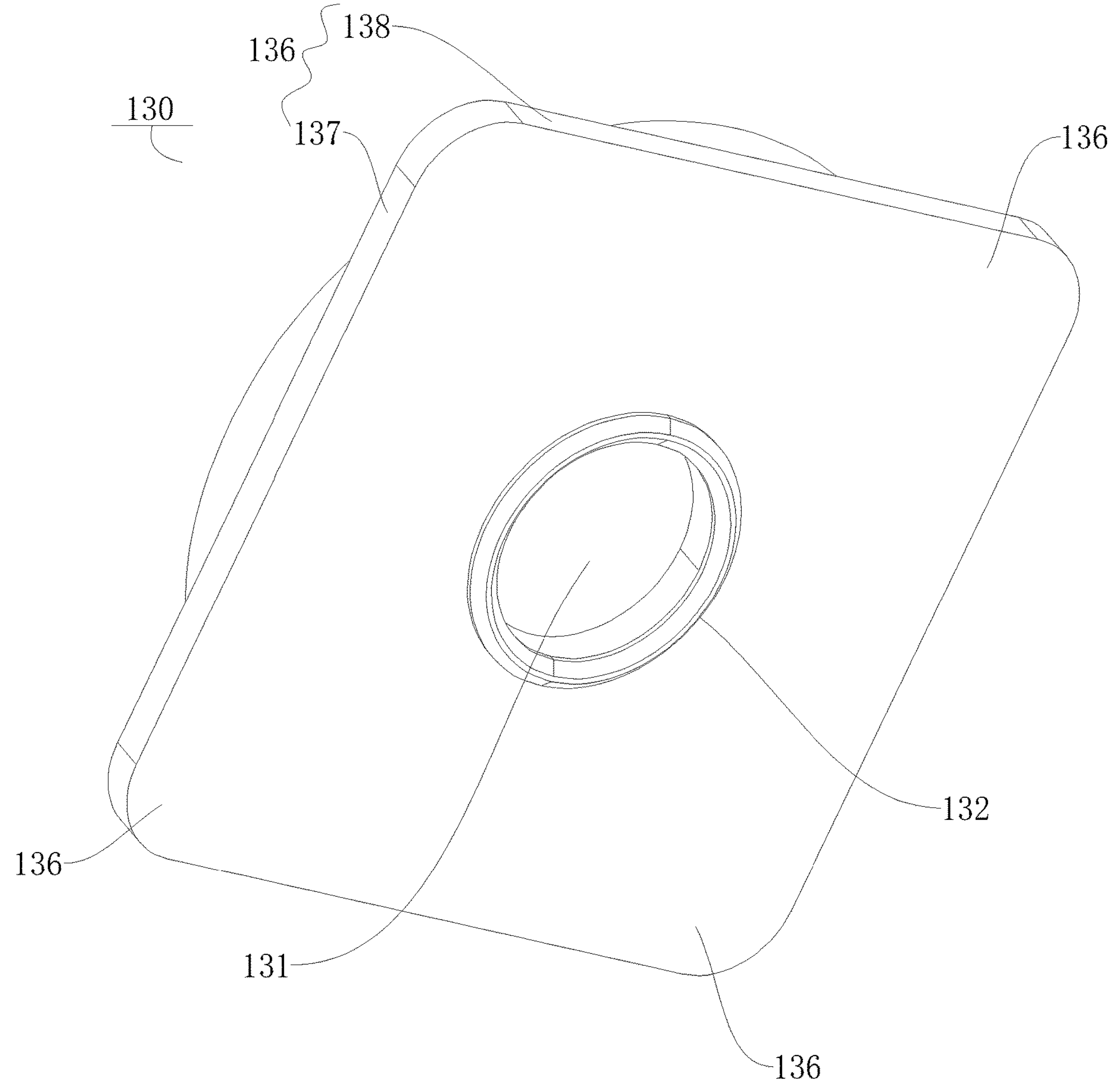
FIG. 15 is an isometric view of an insulating member in FIG. 9 from another view.
Figure 16:
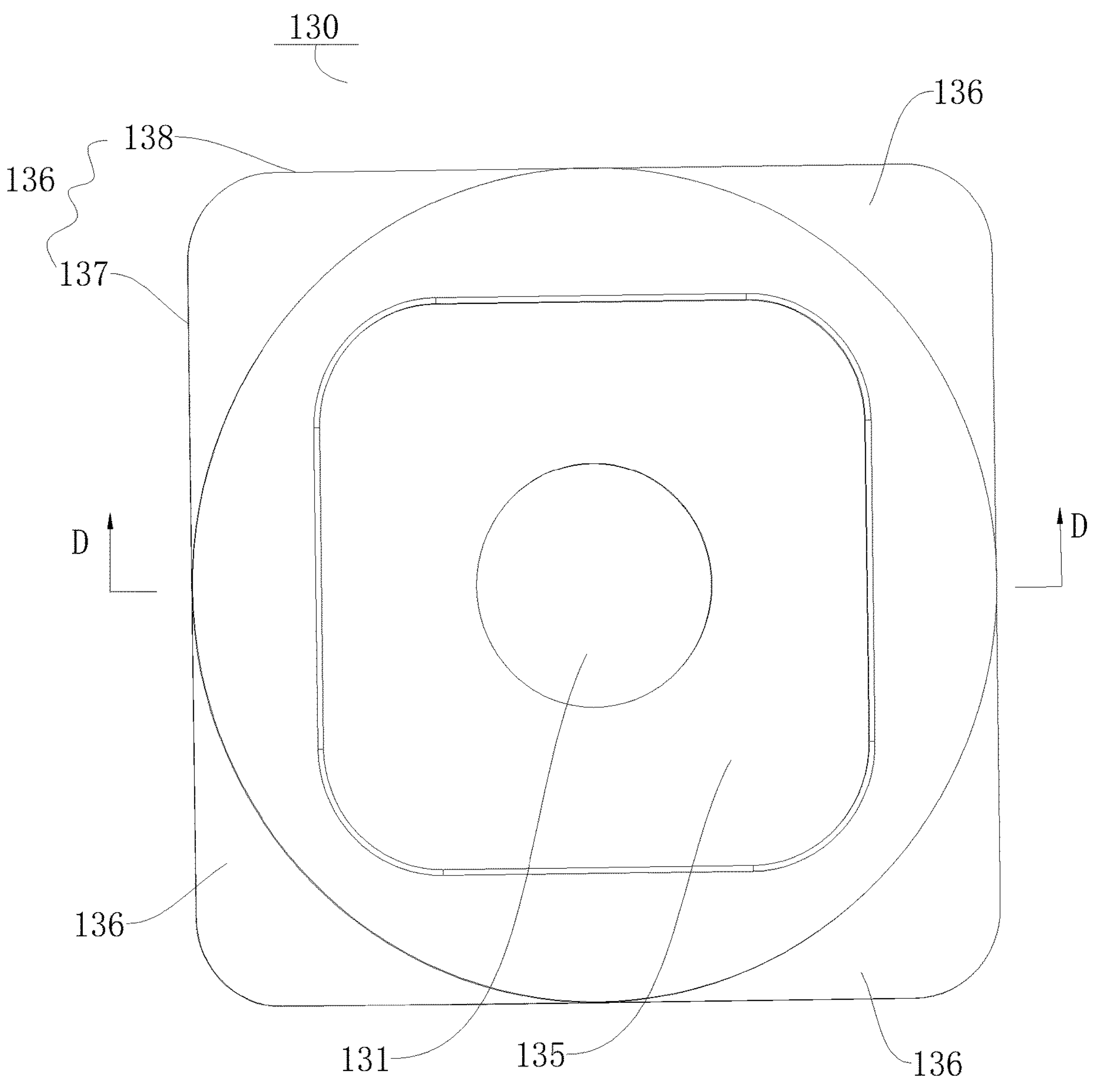
FIG. 16 is a top view of the insulating member in FIG. 9.

According to some implementations of the disclosure, as illustrated in FIGS. 14-16, the insulating member 130 has a boss 132 on a side of the insulating member 130 close to the top cover plate 120. The positioning hole 131 extends through the boss 132. The boss 132 is received in the through hole 121. As such, during assembly, the boss 132 can be received in the through hole 121 for pre-positioning, which facilitates assembling of the insulating member 130 and the top cover plate 120. Further, as illustrated in FIG. 17, the boss 132 has a second chamfer 133 between an end surface of the boss 132 and an inner circumferential wall of the positioning hole 131. The boss 132 has a third chamfer 134 between an end surface and an outer circumferential wall of the boss 132.

It is noted that the boss 132 has chamfered structures at an end corner of the boss 132 in a radial direction. On the one hand, with aid of the chamfering structures, a cutting stress during processing of the pressing block 140 can be eliminated, which can improve structural strength of the pressing block 140. On the other hand, with aid of the third chamfer 134 which acts as a guide, the boss 132 can be guided into the through hole 121 during assembly, and with aid of the second chamfer 133 which acts as a guide, the pole 150 can be guided to be received in the positioning hole 131.

Figures 25, 26:
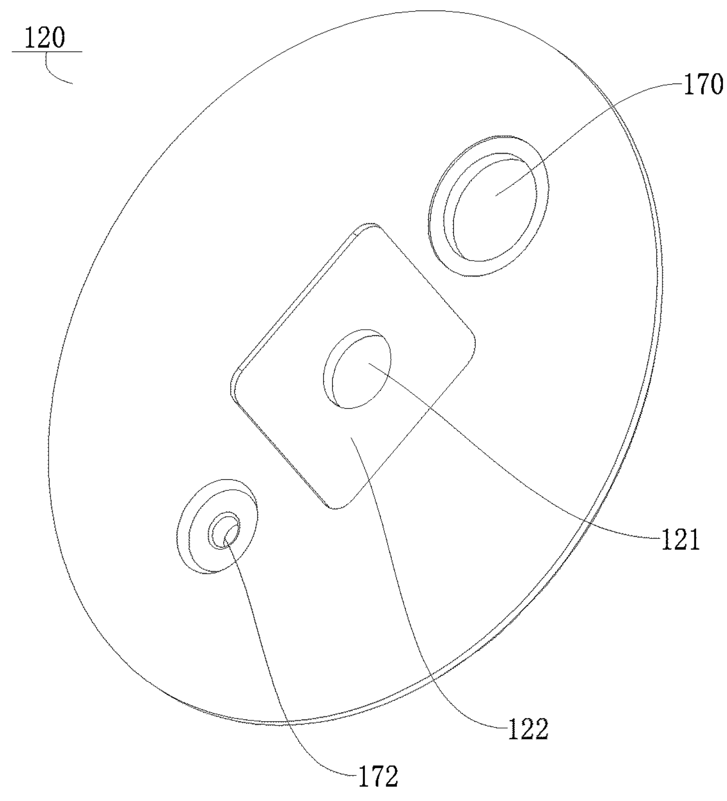
FIG. 25 is an isometric view of a top cover plate in FIG. 9 from one view.
FIG. 26 is a top view of the top cover plate in FIG. 9.
Figure 27:
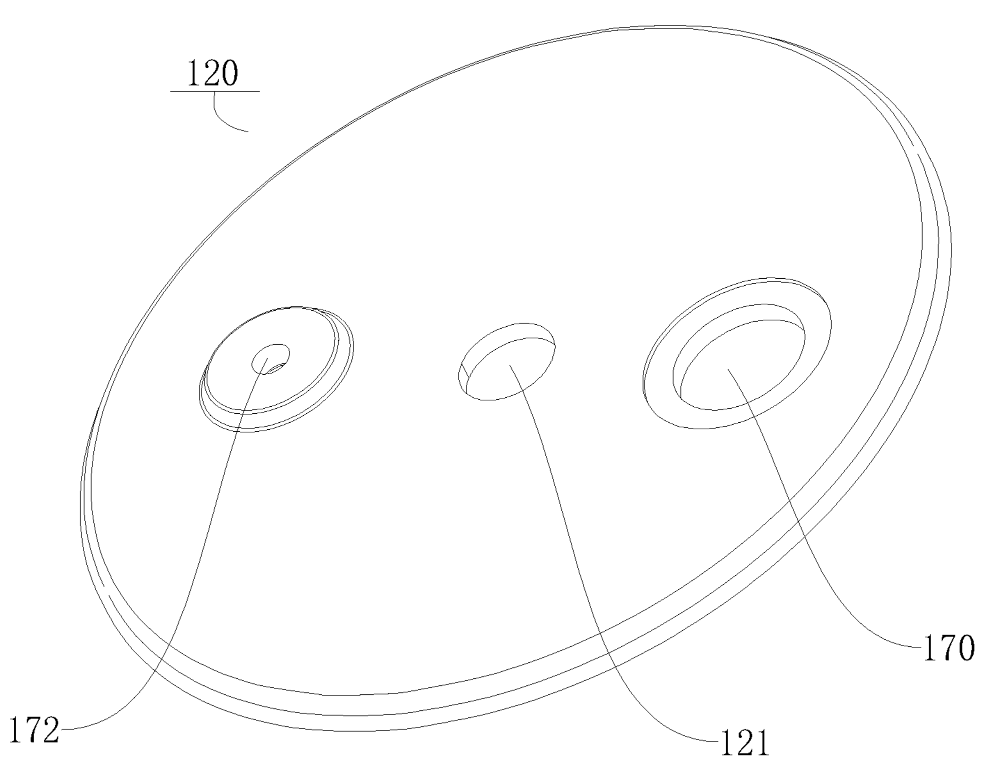
FIG. 27 is an isometric view of the top cover plate in FIG. 9 from another view.

According to some implementations of the disclosure, as illustrated in FIG. 25 and FIG. 26, the top cover plate 120 defines an anti-rotation groove 122. The through hole 121 extends through a bottom of the anti-rotation groove 122. As illustrated in FIGS. 14-16, the insulating member 130 has an anti-rotation flange 136 on a circumferential wall of the insulating member 130. The anti-rotation flange 136 is embedded in the anti-rotation groove 122. Thus, when the insulating member 130 is assembled with the top cover plate 120, the anti-rotation flange 136 has a limiting effect on the insulating member 130 in the circumferential direction of the through hole 121, which can prevent the insulating member 130 from rotating relative to the top cover plate 120.

Further, as illustrated in FIGS. 14-16, the anti-rotation flange 136 includes a first anti-rotation edge 137 and a second anti-rotation edge 138. The first anti-rotation edge 137 and the second anti-rotation edge 138 define an included angle. The included angle may be 90°. An intersection of the first anti-rotation edge 137 and the second anti-rotation edge 138 has a smooth transition. Here, it is noted that, as illustrated in FIG. 16, when the insulating member 130 has a tendency to rotate clockwise, the second anti-rotation edge 138 can abut against an inner circumferential wall of the anti-rotation groove 122 to prevent rotation. When the insulating member 130 has a tendency to rotate counter-clockwise, the first anti-rotation edge 137 can abut against the inner circumferential wall of the anti-rotation groove 122 to prevent rotation. In order to improve an anti-rotation effect, in some examples, the anti-rotation flange 136 includes multiple anti-rotation flanges 136 spaced apart in a circumferential direction of the insulating member 130. Further, the anti-rotation groove 122 may be square.

In some implementations, as illustrated in FIG. 25 and FIG. 26, the top cover assembly 100 defines an explosion-proof hole 170 and a liquid-injection hole 172. It is noted here that the battery 1000 includes the top cover assembly, a battery core 400, and a case 200. In an implementation, the case 200 may be a cylindrical hard case 200. In another implementation, the case 200 may be a hard case 200. One end of the hard case 200 is closed, and the other end of the hard case 200 is open. The top cover assembly 100 can be disposed on the open end of the hard case 200 to seal the hard case 200. The battery core 400 is disposed inside the hard case 200. The explosion-proof hole 170 extends through the top cover plate 120 and the insulating cover plate 110 in sequence, and communicates with the interior of the hard case 200. Similarly, the liquid-injection hole 172 extends through the top cover plate 120 and the insulating cover plate 110 in sequence, and communicates with the interior of the hard case 200. In order to improve safety of the battery 1000, an explosion-proof valve 171 may be disposed at the explosion-proof hole 170. In order to ensure sealing of the battery 1000, after the liquid injection process, the liquid-injection hole 172 can be sealed by a liquid-injection-hole plug 173.

Figure 23:
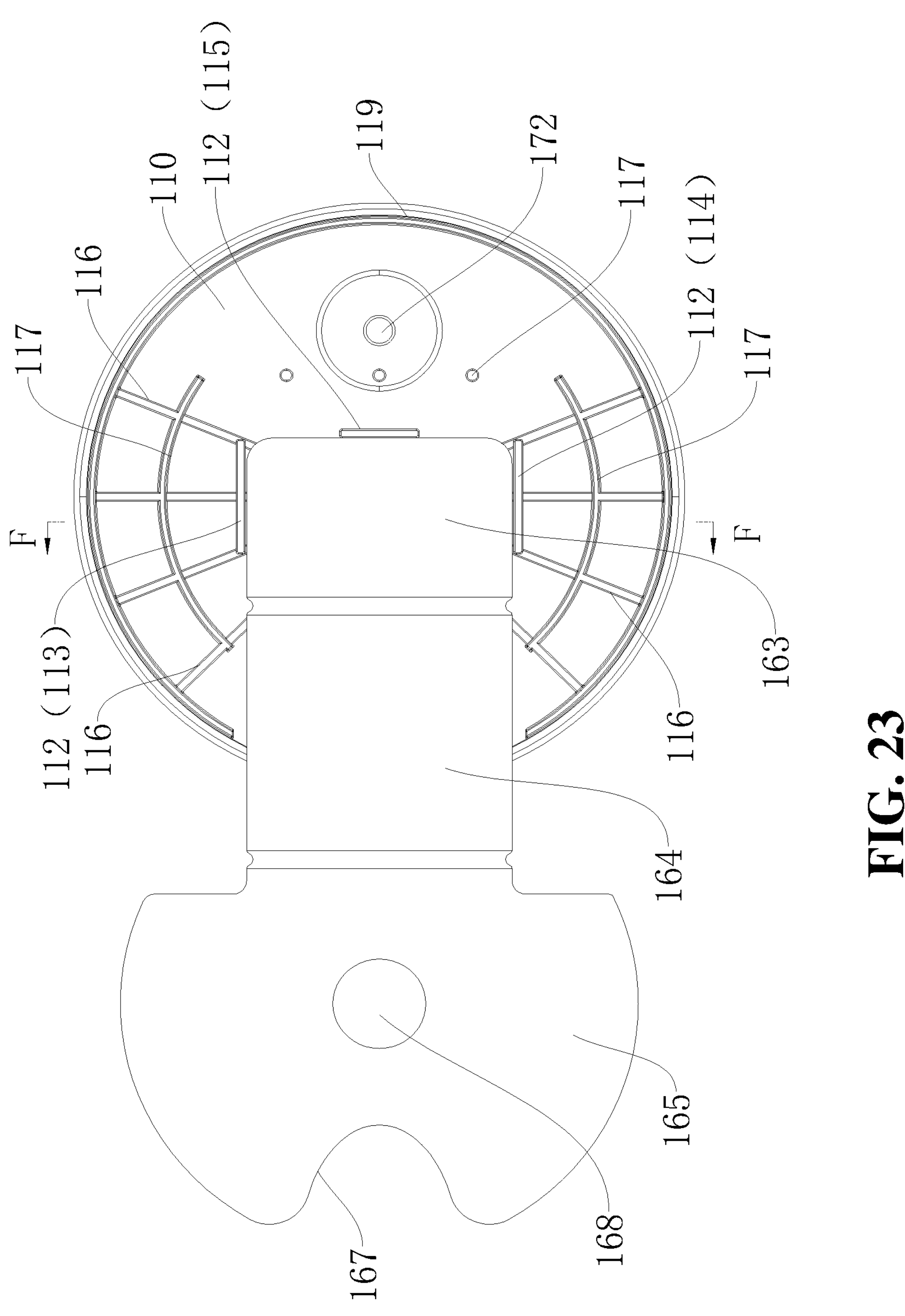
FIG. 23 is a schematic view of an assembly of the insulating cover plate and a current collector in FIG. 9.
Figure 24:
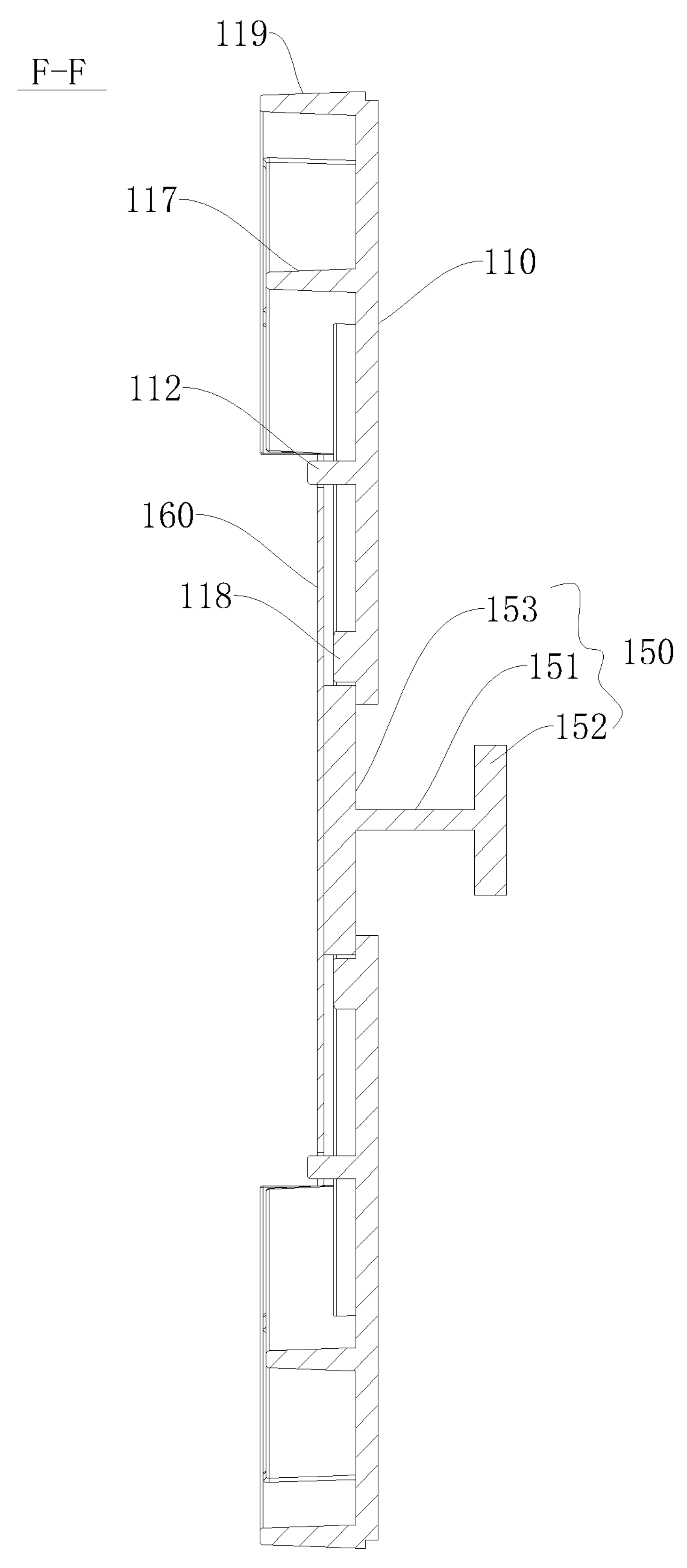
FIG. 24 is a cross-sectional view in direction F-F in FIG. 23.

It is noted that, as illustrated in FIG. 23 and FIG. 24, the top cover assembly 100 may further include the current collector 160. The current collector 160 is welded with the pole 150. The current collector 160 is located on one side of the insulating cover plate 110 away from the insulating member 130. According to some implementations of the disclosure, the insulating cover plate 110 has multiple limiting ribs 112 on one side of the insulating cover plate 110 away from the top cover plate 120. The multiple limiting ribs 112 define a clamping groove, which defines a mounting position of the current collector 160. It is noted that, when welding the current collector 160 and the pole 150, a relative position between the current collector 160 and the pole 150 needs to be determined. By defining the clamping groove with the limiting ribs 112 and positioning the current collector 160 with the clamping groove, assembling the current collector 160 can be facilitated.

Figure 19:
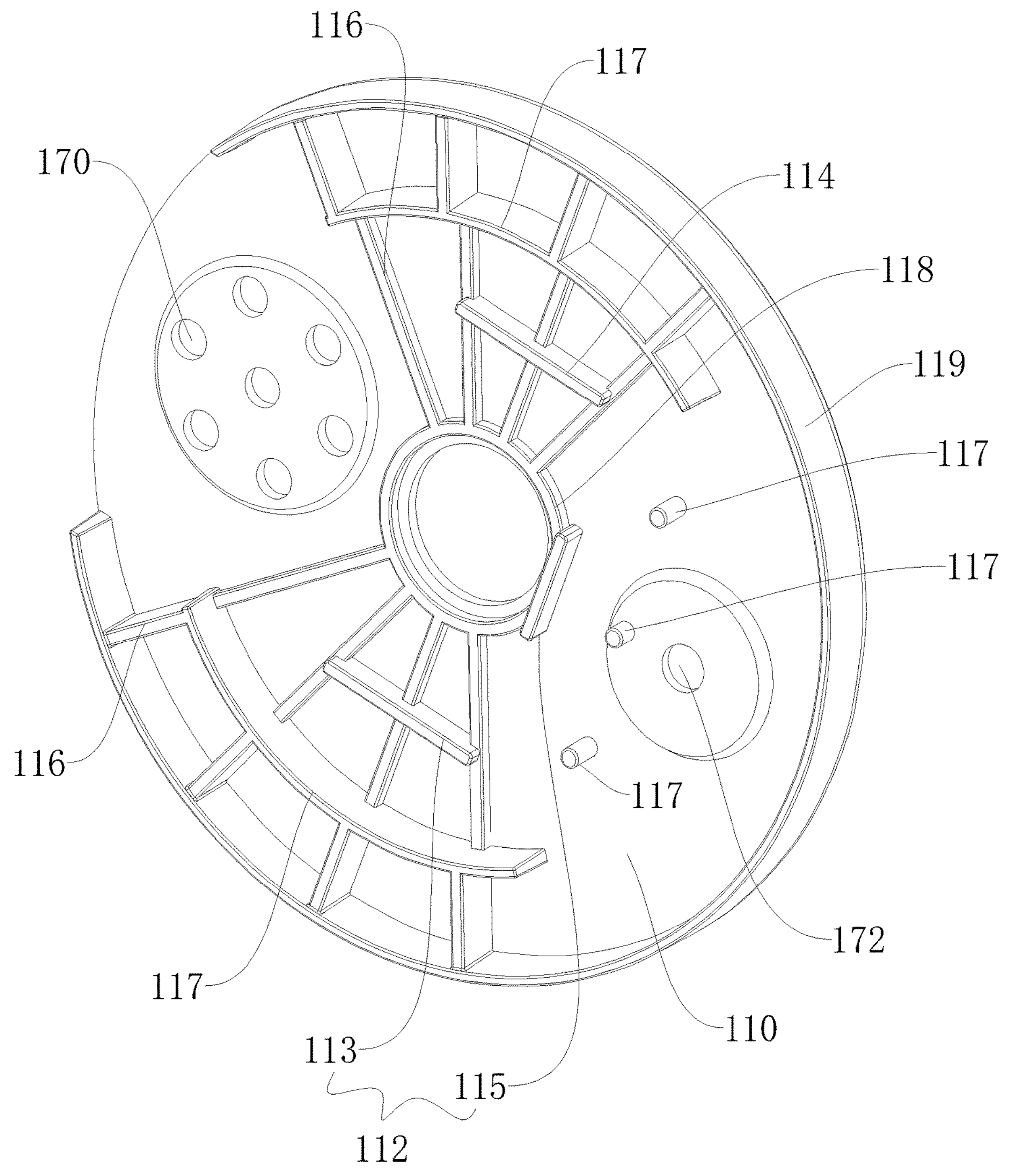
FIG. 19 is an isometric view of the insulating cover plate in FIG. 9 from another view.
Figure 20:
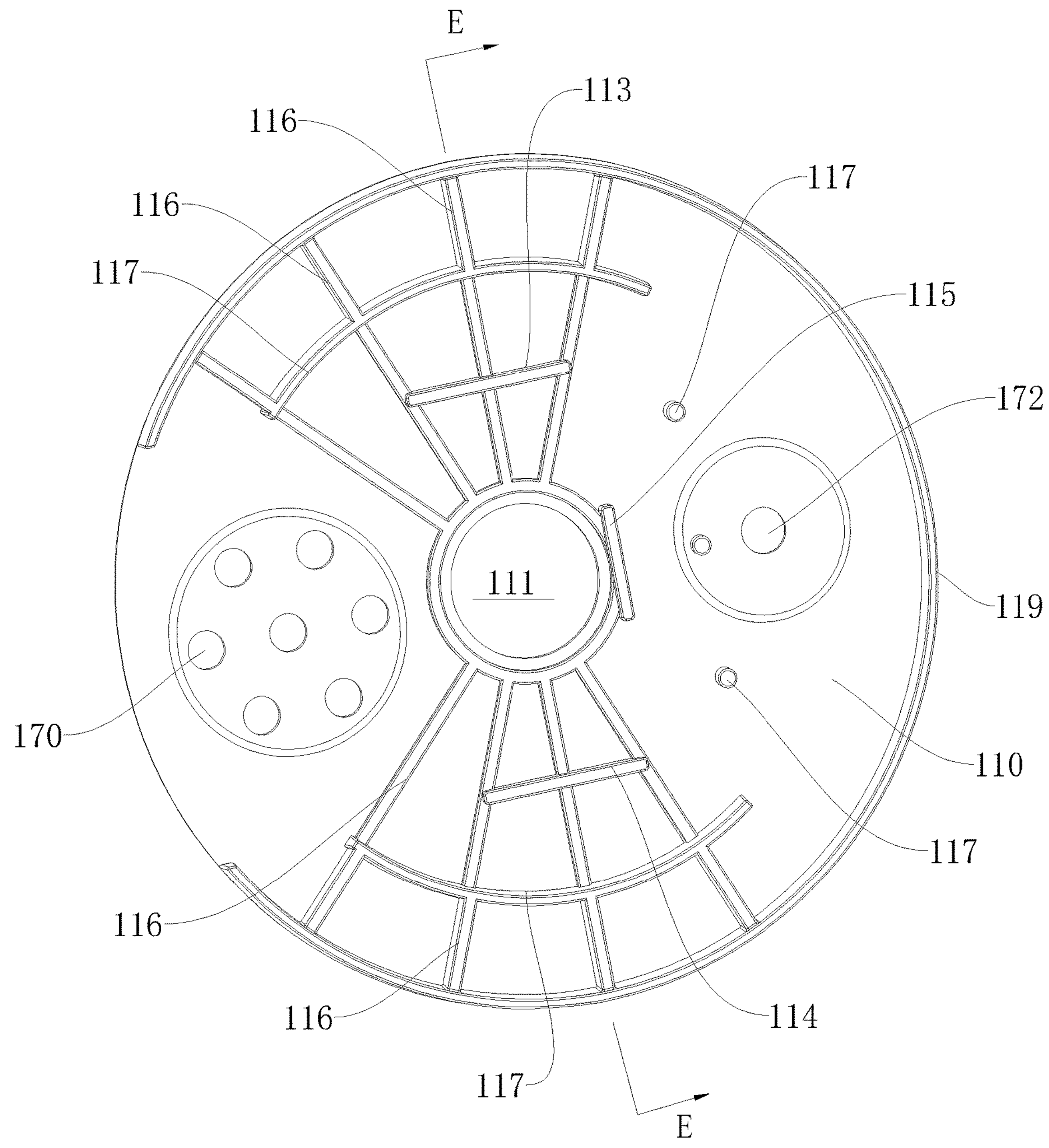
FIG. 20 is a top view of the insulating cover plate in FIG. 9.

An arrangement of the limiting ribs 112 is not limited herein, as long as it can limit the current collector 160. For example, in some examples, as illustrated in FIG. 19, FIG. 20, and FIG. 23, the limiting rib 112 may be three limiting ribs 112, which include a first limiting rib 113, a second limiting rib 114, and a third limiting rib 115. The first limiting rib 113 is parallel to and opposite to the second limiting rib 114. The current collector 160 is between the first limiting rib 113 and the second limiting rib 114, that is, between two parallel limiting ribs 112. The third limiting rib 115 is located at an end of the current collector 160, and the third limiting rib 115 is parallel to an edge of the end of the current collector 160. The third limiting rib 115 is perpendicular to the first limiting rib 113.

Further, in order to strengthen structural strength of the insulating cover plate 110, as illustrated in FIG. 19 and FIG. 20, one side of the insulating cover plate 110 away from the top cover plate 120 has multiple reinforcing ribs 116. In an implementation, the multiple reinforcing ribs 116 are arranged radially with the mounting hole 111 as the center of a circle. Furthermore, at least one of the reinforcing ribs 116 intersects with the limiting rib 112 to form a cross-rib structure, and the cross-rib structure can further improve the structural strength of the top cover plate 120.

Figure 21:
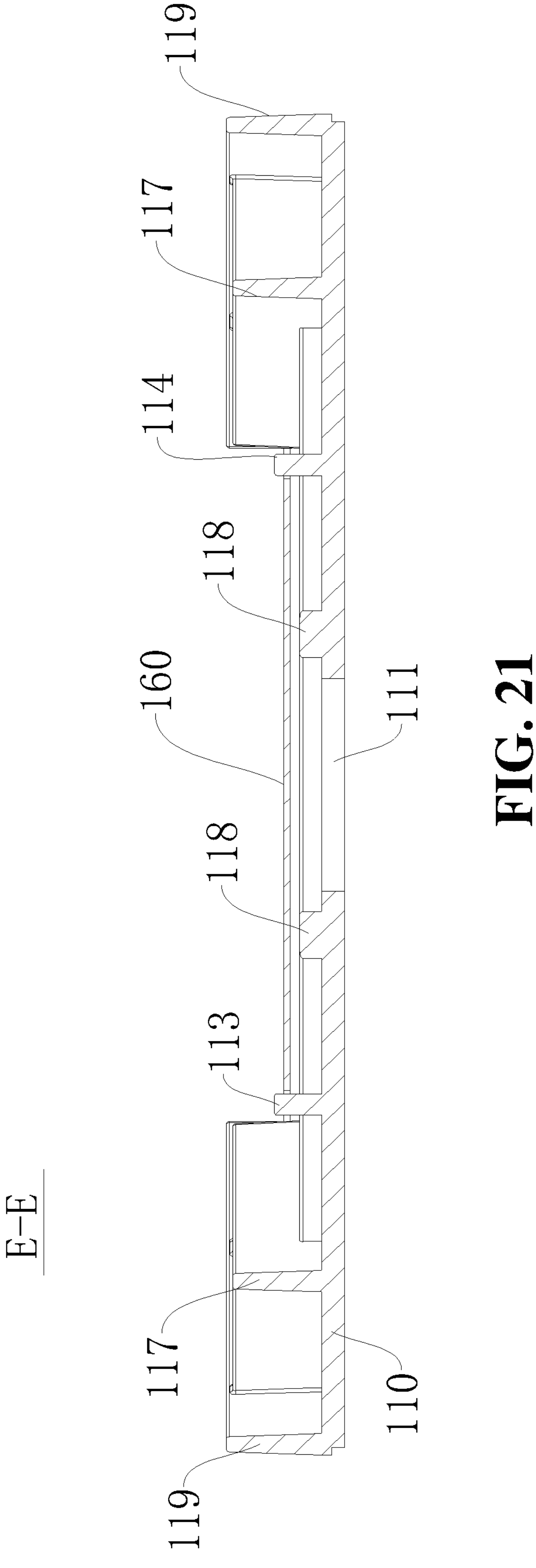
FIG. 21 is a cross-sectional view of the insulating cover plate in FIG. 9.
Figure 22:
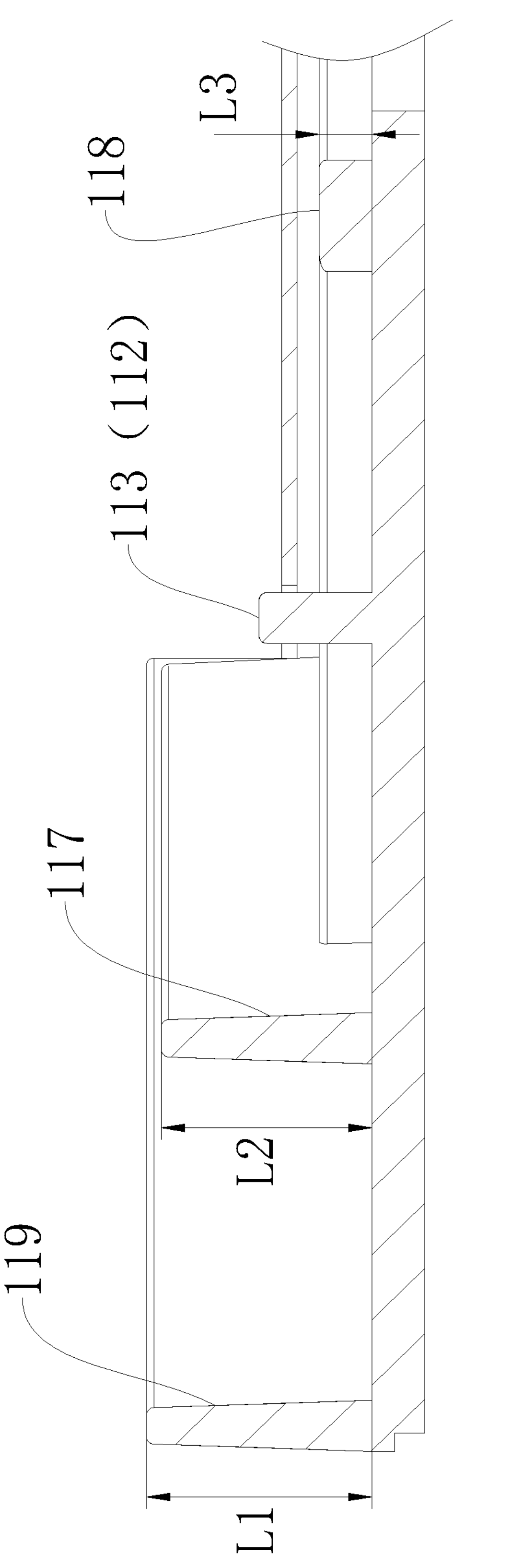
FIG. 22 is a partial structural schematic view of FIG. 21.

According to some implementations of the disclosure, as illustrated in FIGS. 20-22, the insulating cover plate 110 has an abutment portion 117 on one side of the insulating cover plate 110 away from the top cover plate 120. The abutment portion 117 supports the current collector 160. It is noted that the current collector 160 can be accommodated on one side of the insulating cover plate 110 by folding. During assembling the top cover assembly 100, the assembly force exerts a pressing effect on the current collector 160. With aid of the abutment portion 117, the current collector 160 can be supported and protected. Further, the abutment portion 117 may be in a long-strip shape. The abutment portion 117 may extend to have a shape similar to an edge of the current collector 160. For example, the current collector 160 may be an arc-shaped rib. Further, as illustrated in FIG. 20, two abutment portions 117 symmetrically distributed with respect to the mounting hole 111. It is noted here that the shape of the abutment portion 117 is not limited herein. For example, in some implementations, the abutment portion 117 is cylindrical, and multiple abutment portions 117 are arranged at intervals.

In order to improve the mounting stability of the pole 150, in some implementations, the insulating cover plate 110 has a protective flange 118 on one side of the insulating cover plate 110 away from the top cover plate 120. The protective flange 118 surrounds an outer circumference of the pole 150. As such, a contact area between the inner circumferential wall of the mounting hole 111 and the pole 150 can be increased, and the pole 150 can be protected and supported by the protective flange 118 to prevent the pole 150 from being deformed or inclined. In addition, the protective flange 118 can increase the structural strength of the insulating cover plate 110, that is, the protective flange 118 can act as the reinforcing rib 116 to increase the structural strength of the insulating cover plate 110.

Figure 18:
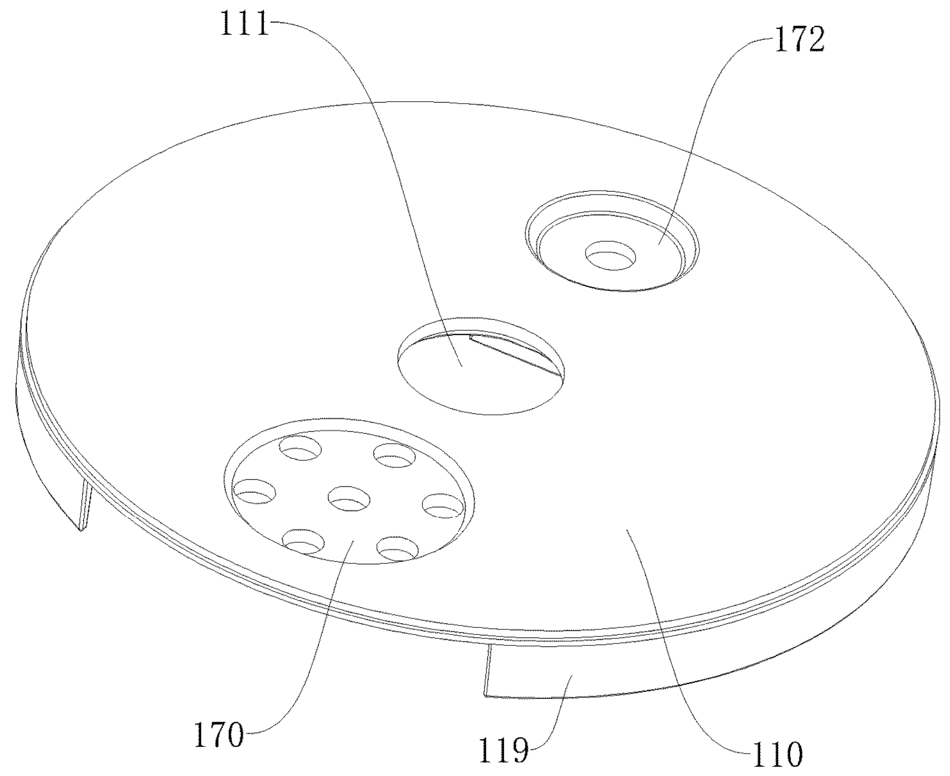
FIG. 18 is an isometric view of an insulating cover plate in FIG. 9 from one view.

As illustrated in FIG. 18, according to some implementations of the disclosure, the insulating cover plate 110 has a bending edge 119 on one side of the insulating cover plate 110 away from the top cover plate 120. The bending edge 119 is located at an edge of the insulating cover plate 110 and extends in a circumferential direction of the insulating cover plate 110. On the one hand, the bending edge 119 can increase the structural strength of the insulating cover plate 110. On the other hand, with the bending edge 119, a substantially closed receiving space can be formed to accommodate the current collector 160 and protect the current collector 160 from being squeezed and collided.

In order to better accommodate the current collector 160, in some implementations, as illustrated in FIG. 21 and FIG. 22, a height of the bending edge 119 is larger than a height of the abutment portion 117. As such, a height difference between the bending edge 119 and the abutment portion 117 can define a reserved space, and part of the current collector 160 can be accommodated in the reserved space. It is noted that, when the current collector 160 is assembled with the insulating cover plate 110, the current collector 160 needs to be folded. Due to different layers of folding, the current collector 160 has different thicknesses at different regions. In order to better accommodate the folded current collector 160, in some implementations, as illustrated in FIG. 21 and FIG. 22, the height of the abutment portion 117 is larger than the height of the protective flange 118. As such, a height difference between the abutment portion 117 and the protective flange 118 can also define a reserved space to accommodate the current collector 160. For example, as illustrated in FIG. 22, the height of the bending edge 119 is L1, the height of the abutment portion 117 is L2, and the height of the protective flange 118 is L3, where L1>L2>L3.

In order to better protect the current collector 160, in some implementations, the height difference between the bending edge 119 and the protective flange 118 is larger than a thickness of a space occupied by the current collector 160. As such, the current collector 160 can be completely accommodated in the reserved space defined by the bending edge 119 and the abutment portion 117.

Figure 28:
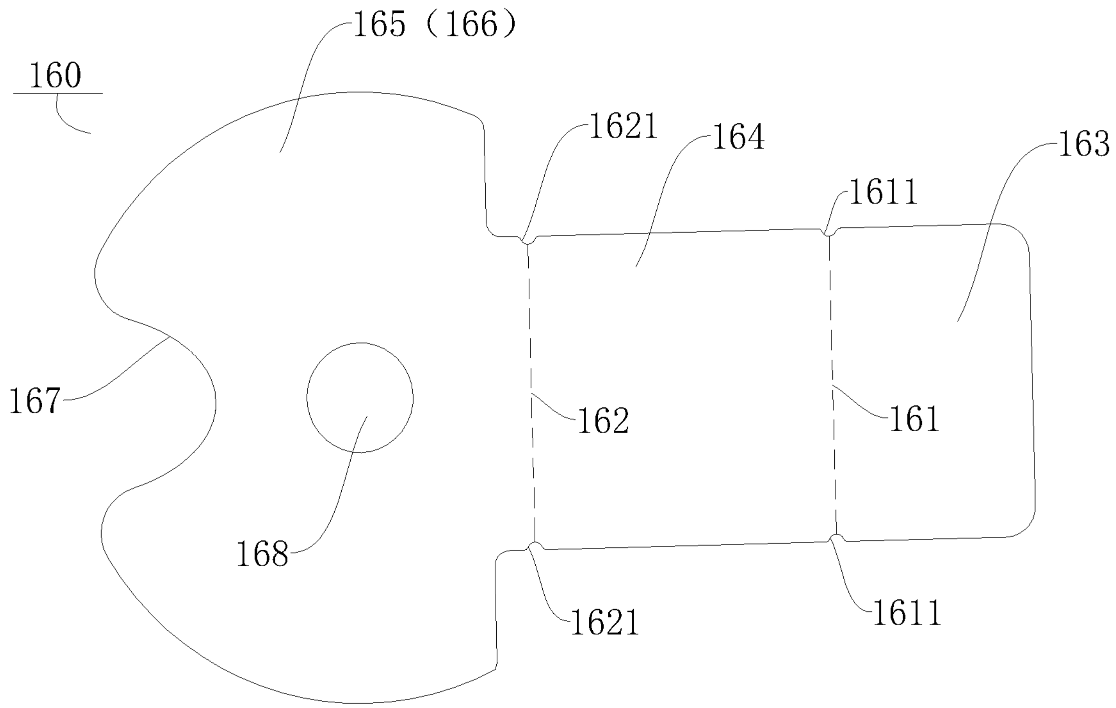
FIG. 28 is a top view of the current collector in FIG. 9, the current collector is in a deployed state.
Figure 29:
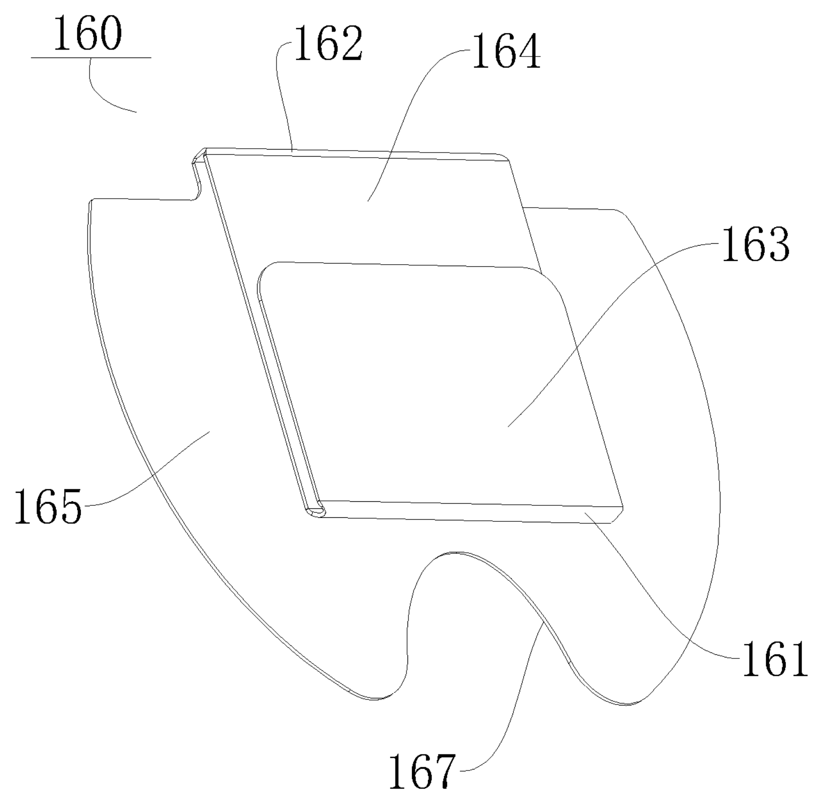
FIG. 29 is a schematic structural view of the current collector in FIG. 9, the current collector is in a folded state.

According to some implementations of the disclosure, as illustrated in FIG. 28 and FIG. 29, the current collector 160 has a first crease 161 and a second crease 162. The first crease 161 is spaced apart from the second crease 162 in a length direction of the current collector 160. The first crease 161 and the second crease 162 extend in a width direction of the current collector 160. The current collector 160 is divided by the first crease 161 and the second crease 162 into a first part 163, a second part 164, and a third part 165. The first part 163 is bent toward one side of the second part 164 and welded with the pole 150. The third part 165 is bent toward the other side of the second part 164 to be welded with the battery core 400.

It is noted that, when folding the current collector 160, the current collector 160 is folded in two different directions, so that the first part 163 and the third part 165 can be spaced apart by the second part 164 when the current collector 160 is folded. As such, when the first part 163 is welded with the pole 150, an influence of the welding process on the third part 165 can be reduced. Similarly, when the third part 165 is welded with tabs of the battery cell, an influence of the welding process on the first part 163 can also be reduced.

Figure 30:
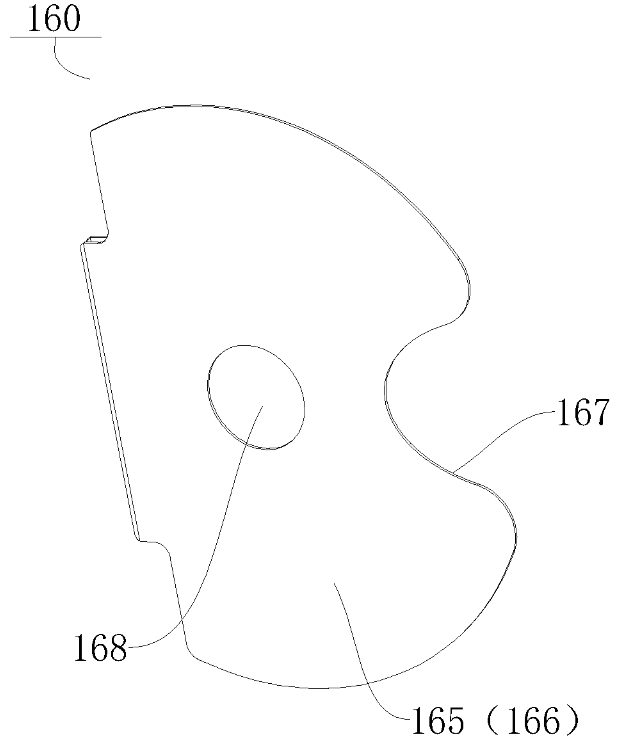
FIG. 30 is a schematic structural view of the current collector in FIG. 9, the current collector is in a folded state.
Figure 31:
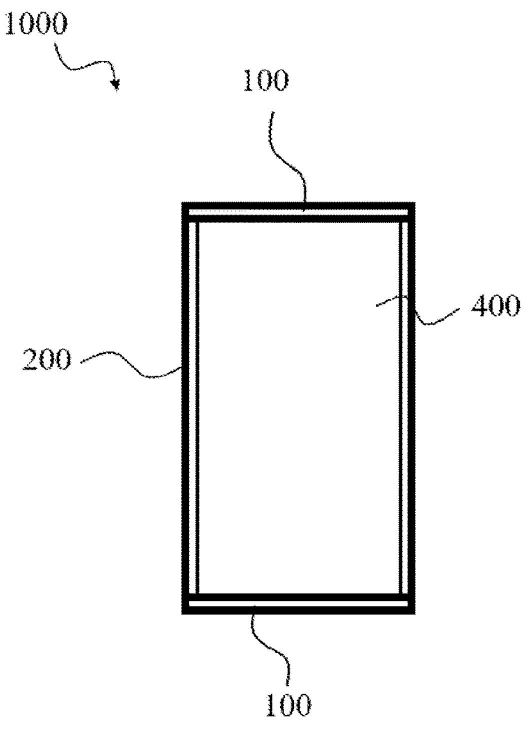
FIG. 31 is a schematic structural view of a battery according to implementations of the disclosure.
Figure 32:
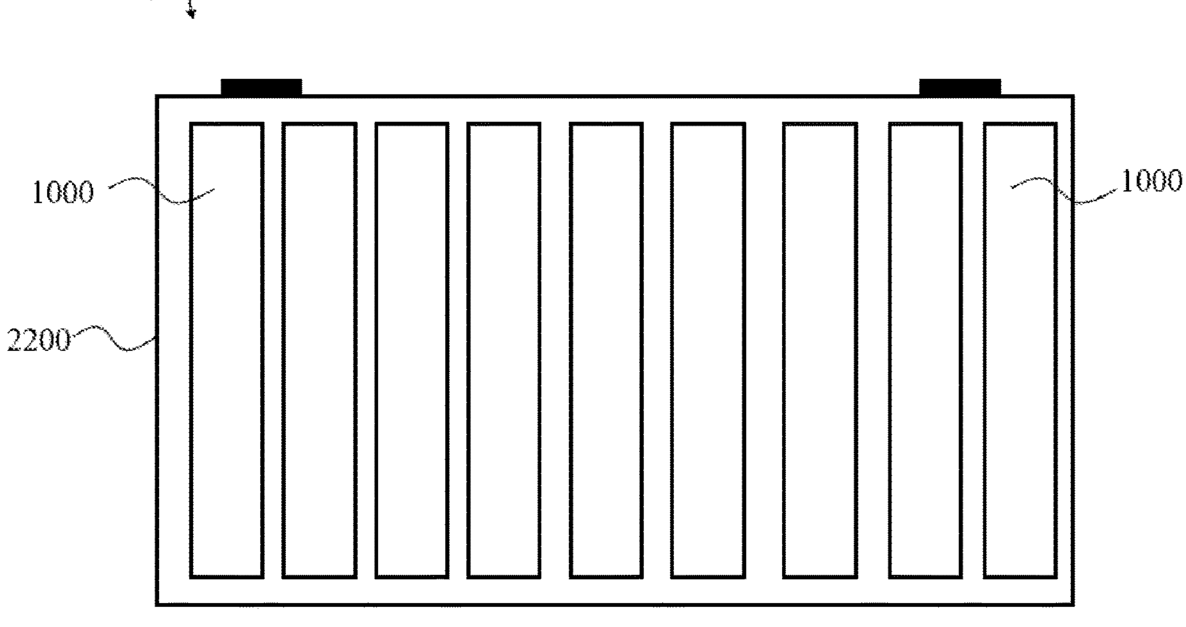
FIG. 32 is a schematic structural view of an energy storage device according to implementations of the disclosure.

In addition, in the length direction of the current collector 160, a length of the first part 163 is smaller than a length of the second part 164. As such, when the current collector 160 is folded, parts of the current collector 160 can be staggered, so that an overall thickness of the folded current collector 160 may have a stepwise change. On the one hand, the current collector 160 can be accommodated on one side of the insulating member 130. On the other hand, functional regions or avoidance structures can be set on different parts. For example, as illustrated in FIG. 28 and FIG. 30, the third part 165 has an enlarged section 166, a width of the enlarged section 166 is larger than that of the second part 164. The enlarged section 166 has an avoidance gap 167. The avoidance gap 167 can avoid explosion-proof valve. The avoidance gap 167 extends through part of an edge of the enlarged section 166. Further, the enlarged section 166 has an avoidance hole 168 opposite to one end of the pole 150.

In some implementations, as illustrated in FIG. 28, at least one of the first crease 161 and the second crease 162 extends along a straight line, which facilitates folding of the current collector 160. It is noted that, when the current collector 160 is folded, due to ductility of a material of the current collector 160, material accumulation is prone to occur at crease positions. In order to solve this technical problem, in some implementations of the disclosure, as illustrated in FIG. 28, the first crease 161 have first grooves 1611 at both ends thereof, and the second crease 162 have second grooves 1621 at both ends thereof.

A battery 1000 according to the implementations of the disclosure includes a case 200, a top cover assembly 100 covering the case 200, and a battery core 400 received in the case 200. The battery core 400 is electrically coupled with the top cover assembly 100. The top cover assembly 100 for a battery 1000 is described above. In an implementation, the case 200 is a cylindrical hard case 200. In another implementation, the case 200 is a hard case 200. It is noted that the battery 1000 can be a single cell, and multiple single-cells can be assembled into a battery pack, an energy storage device, or a charging station. One end of the hard case 200 is closed, and the other end of the hard case 200 is open. The top cover assembly 100 can be arranged at the open end of the hard case 200 to seal the hard case 200. The battery core 400 is disposed inside the hard case 200. For example, the insulating cover plate 110 can be a lower plastic, the insulating member 130 can be an upper plastic. The battery 1000 may be a secondary battery.

In the battery 1000 according to the implementations of the disclosure, the limiting hole 141 is stepped and used to receive solder or a riveting deformation structure of one end of the pole 150, which allows not only a flatness improvement but also a tolerance adjustment to the top cover assembly 100, the assembly accuracy of the top cover assembly 100 is improved, and thus the top cover assembly 100 is optimized in structure.

An energy storage device 2000 is provided according to the implementations of the disclosure. The energy storage device 2000 includes a housing 2200 and multiple above-mentioned batteries 1000. The multiple batteries 1000 are received in the housing 2200. The limiting hole 141 is stepped and used to receive solder or a riveting deformation structure of one end of the pole 150, which allows not only a flatness improvement but also a tolerance adjustment to the top cover assembly 100, the assembly accuracy of the top cover assembly 100 is improved, and thus the top cover assembly 100 is optimized in structure.

In the description of the disclosure, descriptions with reference to terms such as "one implementation", "some implementations", "examples", "specific examples", or "some examples" mean that specific features, structures, materials, or characteristics described in combination with the implementations or examples are included in at least one implementation or example of the disclosure. The schematic expressions of the above terms herein do not necessarily refer to the same implementation or example.

Although the implementations of the disclosure have been illustrated and described, it is appreciated by those of ordinary skill in the art that various variations, modifications, replacements, and variants of these implementations can be made without departing from the principles and purposes of the disclosure, the scope of disclosure is defined by the claims and their equivalents.

What is claimed is:

1. A top cover assembly for a battery, comprising:

a pole;

a pressing block defining a limiting hole, the pole extending through and is at least partially located in the limiting hole, the limiting hole having a first hole section and a second hole section axially connected with the first hole section, and the first hole section having a radial size larger than the second hole section;

an insulating cover plate stacked with the pressing block, the insulating cover plate has a mounting hole opposite to the limiting hole, and the pole extends through the mounting hole;

an insulating member;

a top cover plate sandwiched between the insulating member and the insulating cover plate; and a sealing member;

wherein the pole has a main body, a first flange, and a second flange, the first flange being located at an edge of one end of the main body, projecting radially from the main body, and extending in a circumferential direction of the main body, and the second flange being located at an edge of the other end of the main body, projecting radially from the main body, and extending in the circumferential direction of the main body;

wherein a surface of the second flange close to the first flange, an inner circumferential wall of the mounting hole, a surface of the top cover plate close to the second flange and extending beyond the inner circumferential wall of the mounting hole define a sealing cavity, and the sealing member is received in the sealing cavity;

wherein the sealing member is in direct contact with all of the main body, the second flange, and the top cover plate;

wherein the top cover plate defines a through hole, an inner circumferential wall of the through hole and an outer circumferential wall of the main body define a gap therebetween, the sealing cavity has an opening at a position close to the gap, and the sealing cavity communicates with the gap via the opening;

wherein the insulating member defines a positioning hole, the insulating member has a boss on a side of the insulating member close to the top cover plate, the positioning hole extends through the boss, the boss is received in the through hole, the boss has a chamfer between an end surface of the boss and an inner circumferential wall of the positioning hole and another chamfer between an end surface and an outer circumferential wall of the boss; and wherein the entire boss is received in the gap, part of the sealing member is received in the gap, and the sealing member is completely spaced apart from the entire boss.

2. The top cover assembly for the battery of claim 1, wherein:

the limiting hole further has a third hole section;

the third hole section, the second hole section, and the first hole section are sequentially connected in an axial direction of the limiting hole; and the third hole section has a radial size smaller than the second hole section to form a step portion, the step portion abutting against the pole.

3. The top cover assembly for the battery of claim 2, wherein the main body is at least partially located in the third hole section, and the first flange is at least partially located in the second hole section and abuts against the step portion.

4. The top cover assembly for the battery of claim 3, wherein a surface of the first flange away from the second flange is flush with an inner bottom surface of the first hole section.

5. The top cover assembly for the battery of claim 3, wherein the second flange is located at one side of the insulting cover plate away from the pressing block and abuts against the insulting cover plate.

6. The top cover assembly for the battery of claim 5, wherein the pressing block, the insulating member, the top cover plate, and the insulating cover plate are sandwiched between the first flange and the second flange.

7. The top cover assembly for the battery of claim 6, wherein the limiting hole has a first chamfer at one end of the limiting hole close to the insulating member.

8. The top cover assembly for the battery of claim 1, wherein the sealing member is spaced apart from the pressing block by the insulating member.

9. The top cover assembly for the battery of claim 1, wherein the mounting hole has a cross-section gradually decreased in area in a direction from the second flange to the first flange.

10. A battery, comprising a case, a top cover assembly covering the case, and a battery core received in the case and electrically coupled with the top cover assembly, wherein the top cover assembly comprises:

a pole;

a pressing block defining a limiting hole, the pole extending through and is at least partially located in the limiting hole, the limiting hole having a first hole section and a second hole section axially connected with the first hole section, and the first hole section having a radial size larger than the second hole section;

an insulating cover plate stacked with the pressing block, the insulating cover plate has a mounting hole opposite to the limiting hole, and the pole extends through the mounting hole;

an insulating member;

a top cover plate sandwiched between the insulating member and the insulating cover plate; and a sealing member;

wherein the pole has a main body, a first flange, and a second flange, the first flange being located at an edge of one end of the main body, projecting radially from the main body, and extending in a circumferential direction of the main body, and the second flange being located at an edge of the other end of the main body, projecting radially from the main body, and extending in the circumferential direction of the main body;

wherein a surface of the second flange close to the first flange, an inner circumferential wall of the mounting hole, a surface of the top cover plate close to the second flange and extending beyond the inner circumferential wall of the mounting hole define a sealing cavity, and the sealing member is received in the sealing cavity;

wherein the sealing member is in direct contact with all of the main body, the second flange, and the top cover plate;

wherein the top cover plate defines a through hole, an inner circumferential wall of the through hole and an outer circumferential wall of the main body define a gap therebetween, the sealing cavity has an opening at a position close to the gap, and the sealing cavity communicates with the gap via the opening;

wherein the insulating member defines a positioning hole, the insulating member has a boss on a side of the insulating member close to the top cover plate, the positioning hole extends through the boss, the boss is received in the through hole, the boss has a chamfer between an end surface of the boss and an inner circumferential wall of the positioning hole and another chamfer between an end surface and an outer circumferential wall of the boss; and wherein the entire boss is received in the gap, part of the sealing member is received in the gap, and the sealing member is completely spaced apart from the entire boss.

11. The battery of claim 10, wherein:

the limiting hole further has a third hole section;

the third hole section, the second hole section, and the first hole section are sequentially connected in an axial direction of the limiting hole; and the third hole section has a radial size smaller than the second hole section to form a step portion, the step portion abutting against the pole.

12. The battery of claim 11, wherein the main body is at least partially located in the third hole section, and the first flange is at least partially located in the second hole section and abuts against the step portion.

13. The battery of claim 12, wherein a surface of the first flange away from the second flange is flush with an inner bottom surface of the first hole section.

14. The battery of claim 12, wherein the second flange is located at one side of the insulting cover plate away from the pressing block and abuts against the insulting cover plate.

15. The battery of claim 14, wherein the limiting hole has a first chamfer at one end of the limiting hole close to the insulating member.

16. An energy storage device, comprising a housing and a plurality of batteries received in the housing, wherein each of the plurality of batteries comprises a case, a top cover assembly covering the case, and a battery core received in the case and electrically coupled with the top cover assembly, and the top cover assembly comprises:

a pole;

a pressing block defining a limiting hole, the pole extending through and is at least partially located in the limiting hole, the limiting hole having a first hole section and a second hole section axially connected with the first hole section, and the first hole section having a radial size larger than the second hole section;

an insulating cover plate stacked with the pressing block, the insulating cover plate has a mounting hole opposite to the limiting hole, and the pole extends through the mounting hole;

an insulating member;

a top cover plate sandwiched between the insulating member and the insulating cover plate; and a sealing member;

wherein the pole has a main body, a first flange, and a second flange, the first flange being located at an edge of one end of the main body, projecting radially from the main body, and extending in a circumferential direction of the main body, and the second flange being located at an edge of the other end of the main body, projecting radially from the main body, and extending in the circumferential direction of the main body;

wherein a surface of the second flange close to the first flange, an inner circumferential wall of the mounting hole, a surface of the top cover plate close to the second flange and extending beyond the inner circumferential wall of the mounting hole define a sealing cavity, and the sealing member is received in the sealing cavity;

wherein the sealing member is in direct contact with all of the main body, the second flange, and the top cover plate;

wherein the top cover plate defines a through hole, an inner circumferential wall of the through hole and an outer circumferential wall of the main body define a gap therebetween, the sealing cavity has an opening at a position close to the gap, and the sealing cavity communicates with the gap via the opening;

wherein the insulating member defines a positioning hole, the insulating member has a boss on a side of the insulating member close to the top cover plate, the positioning hole extends through the boss, the boss is received in the through hole, the boss has a chamfer between an end surface of the boss and an inner circumferential wall of the positioning hole and another chamfer between an end surface and an outer circumferential wall of the boss; and wherein the entire boss is received in the gap, part of the sealing member is received in the gap, and the sealing member is completely spaced apart from the entire boss.

17. The energy storage device of claim 16, wherein:

the limiting hole further has a third hole section;

the third hole section, the second hole section, and the first hole section are sequentially connected in an axial direction of the limiting hole; and the third hole section has a radial size smaller than the second hole section to form a step portion, the step portion abutting against the pole.

18. The energy storage device of claim 17, wherein the main body is at least partially located in the third hole section, and the first flange is at least partially located in the second hole section and abuts against the step portion.

* * * * *